(12) United States Patent
Friedman

(10) Patent No.: US 9,964,651 B2
(45) Date of Patent: *May 8, 2018

(54) ULTRA-THIN PLASMA PANEL RADIATION DETECTOR

(71) Applicant: INTEGRATED SENSORS, LLC, Ottawa Hills, OH (US)

(72) Inventor: Peter S. Friedman, Ottawa Hills, OH (US)

(73) Assignee: Integrated Sensors, LLC, Ottawa Hills, OH (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/652,358

(22) Filed: Jul. 18, 2017

(65) Prior Publication Data
US 2017/0350991 A1    Dec. 7, 2017

Related U.S. Application Data

(63) Continuation-in-part of application No. 15/404,713, filed on Jan. 12, 2017, which is a continuation of
(Continued)

(51) Int. Cl.
*G01J 1/42* (2006.01)
*G01T 1/185* (2006.01)
(Continued)

(52) U.S. Cl.
CPC ............. *G01T 1/185* (2013.01); *G01T 1/18* (2013.01); *G01T 1/2935* (2013.01)

(58) Field of Classification Search
CPC ............. G01T 1/18; G01T 1/185; H01J 47/00
(Continued)

(56) References Cited

U.S. PATENT DOCUMENTS 2,876,360 A    3/1959    Victoreen
3,614,437 A    10/1971    Allemand et al.
(Continued)

FOREIGN PATENT DOCUMENTS

EP    1274115 A2    1/2003

OTHER PUBLICATIONS

Anderson et al.; "A Low-Pressure, Micro-Strip as Chamber Operated with Secondary-Electron Emission"; Nuc.Instr. and Meth.; A346 (1994); 102106.
(Continued)

*Primary Examiner* — David Porta
*Assistant Examiner* — Meenakshi Sahu
(74) *Attorney, Agent, or Firm* — Potomac Law Group, PLLC

(57) ABSTRACT

An ultra-thin radiation detector includes a radiation detector gas chamber having at least one ultra-thin chamber window and an ultra-thin first substrate contained within the gas chamber. The detector further includes a second substrate generally parallel to and coupled to the first substrate and defining a gas gap between the first substrate and the second substrate. The detector further includes a discharge gas between the substrates and contained within the gas chamber, where the discharge gas is free to circulate within the gas chamber and between the first and second substrates at a given gas pressure. The detector further includes a first electrode coupled to one of the substrates and a second electrode electrically coupled to the first electrode. The detector further includes a first discharge event detector coupled to at least one of the electrodes for detecting a gas discharge counting event in the electrode.

20 Claims, 17 Drawing Sheets

Related U.S. Application Data application No. 14/218,820, filed on Mar. 18, 2014, now Pat. No. 9,551,795.

(60) Provisional application No. 61/852,426, filed on Mar. 15, 2013.

(51) Int. Cl.
*G01T 1/29* (2006.01)
*G01T 1/18* (2006.01)

(58) Field of Classification Search
USPC .............................. 250/372, 374, 375, 382
See application file for complete search history.

(56) References Cited

U.S. PATENT DOCUMENTS

| | | | |
|---|---|---|---|
| 3,772,521 A | 11/1973 | Perez-Mendez | |
| 3,786,270 A | 1/1974 | Borkowski et al. | |
| 4,365,159 A | 12/1982 | Young | |
| 4,392,057 A | 7/1983 | Mathieson et al. | |
| 4,591,717 A | 5/1986 | Scherber | |
| 4,816,683 A | 3/1989 | Marsden | |
| 4,937,455 A | 6/1990 | Kurz | |
| 4,999,501 A | 3/1991 | Lacy | |
| 5,223,717 A | 6/1993 | Charpak | |
| 5,688,698 A | 11/1997 | Robinson et al. | |
| 5,773,829 A | 6/1998 | Iwanczyk et al. | |
| 6,011,265 A | 1/2000 | Sauli | |
| 6,097,032 A | 8/2000 | Tanimori et al. | |
| 6,584,419 B1 | 6/2003 | Alexander | |
| 6,703,619 B2 | 3/2004 | Takahashi | |
| 6,765,213 B2 | 7/2004 | Shahar et al. | |
| 7,157,718 B2 | 1/2007 | Gianchandani et al. | |
| 7,170,066 B2 | 1/2007 | Virtanen | |
| 7,332,726 B2 | 2/2008 | Friedman et al. | |
| 7,683,340 B2 * | 3/2010 | Friedman | G01T 1/18 250/385.1 |
| 8,389,946 B2 * | 3/2013 | Friedman | G01T 1/185 250/382 |
| 8,710,449 B2 * | 4/2014 | Friedman | G01T 1/18 250/385.1 |
| 9,110,173 B2 * | 8/2015 | Friedman | G01T 1/18 |
| 9,261,607 B2 * | 2/2016 | Friedman | G01T 1/185 |
| 9,551,795 B2 * | 1/2017 | Friedman | G01T 1/185 |
| 2002/0036269 A1 | 3/2002 | Shahar et al. | |
| 2002/0139935 A1 | 10/2002 | Klein et al. | |
| 2005/0242291 A1 | 11/2005 | Gianchandani et al. | |
| 2006/0049362 A1 | 3/2006 | Friedman et al. | |
| 2010/0265078 A1 | 10/2010 | Friedman | |

OTHER PUBLICATIONS

Contract No. DTRA01-03-C-0042; issued by the U.S. Dept. of Defense; Defense Threat Reduction Agency to Photonics Systems, Inc. on May 16, 2003 an completed Oct. 31, 2004.
Lasche et al.; "Detection Sensitivity for Special Nuclear Materals With an Advanced Hig-Pressure Xenon Detector and Robust Fitting Analysis"; IEEE Trans. Mucl. Sci.; 48 (2001); pp. 325-329.
Sauli; GEM: A New Concept for Electron Amplification in Gas Detectors:; Nuc. Instr. and Meth.; A386 (1997); pp. 531-534.
Knoll; "Radiation Detection and Measurement" 3rd ed.; John Wiley & Sons Inc. (2000); pp. 192-194 and 509 (book cover included).
Clergeau et al.; "Operation of Sealed Microstrip Gas Chambers at the Ill"; IEEE Trans. Nucl. Sci.; 48 (2001); pp. 1075-1080.
Bateman et al.; "Studies of the Gain Properties of Microstrip Gas Counters Relevant to Their Application as X-Ray and Electron Detectors"; IEEE Trans. Nuc. Sci.; 49 (2002); pp. 1644-1650.
Bouhali et al.; "The Micromegem Detector"; Nucl. Instr. and Meth.; A459 (2001); pp. 211-220.
Ziock et al.; "A Large-Area PSPMT-Based Gamma-Ray Imager With Edge Reclamation"; IEEE Trans. Nucl. Sci.; 49 (2002); pp. 1552-1559.
Graeve et al.; "High-Resolution CMOS Imaging Detector"; Medical Imaging (2001); Physics of Medical Imaging: SPEI vol. 4320.
Mahler et al.; "A Portable Gamma-Ray Spectrometer Using Compressed Xenon"; IEEE Trans. Nucl. Sci.; NS-45 (1998); pp. 1029-1033.
Fehlau; Integrated Neutron/Gamma-Ray Portal Monitors for Nuclear Safeguards; IEEE Trans. Nucl. Sci.; NS-41 (1994); pp. 922-926.
Nagarkar et al.; "Structured LiI Scintillator for Thermal Neutron Imaging"; IEEE Trans. Nucl. Sci.; NS-48 (2001); pp. 2330-2334.
Kurfess et al. "Coincident Compton Nuclear Medical Imager"; IEEE Nucl. Sci. Symposium; San Diego (2001).
Breskin; "Advances in Gas Avalanche Radiation Detectors for Biomedical Applicaitons"; Nucl. Instr. and Meth.; A454 (2000); pp. 26-39.
Angelini et al.; "The Micro-Gap Chamber"; Nucl. Inst. and Meth; A335 (1993); pp. 69-77.
Beckers et al.; "Optimization of Microstrip Gas Chamber Design and Operating Conditions"; Nucl. Instr. and Meth.; A346 (1994); pp. 95-101.
Breskin et al.; "Ion-Induced Effects in GEM and GEM/MHSP Gaseous Photomultipliers for the UV and Visible Spectral Range"; Nuc. Instr. and Meth.; A553 (2005); pp. 46-52.
Eden et al.; "Recent Advances in Microcavity Plasma Devices and Arrays: A Versatile Photonic Platform"; J. Phys. D App. Phys. 38 (2005); pp. 1644-1648.
Friedman; "A New Class of Low Cost, High Perfromance, Radiation Detectors"; 2005 IEEE Nuclear ; Science Symposium & Medical Imaging Conf. (Puerto Rico); NSS Conf. Record; Paper J03-7; Dec. 2005; pp. 2815-2822.
Ketzer et al.; "Triple GEM Tracking Detectors for Compass"; IEEE Trans. Nucl. Instr. and Meth.; A386; 1997; pp. 531-534.
Friedman; Plasma Panel Sensors as Scintillation Detectors: 2006 IEEE Nuclear Science Symposium & Medical Imaging Conf. (San Diego); NSS Conf. Record; Paper N30-136; Feb. 2007; pp. 1150-1159.
Kurfess et al.; "Considerations for the Next Comption Telescope Mission"; the 5th Compton Symposium; ed. M.L. McConnell and J.M. Ryan; AIP Conference Proceedings; 2000; p. 510.
Bonin et al.; "A Pixel Chamber to Monitor the Beam Performances in Hadron Therapy"; Nuclear Instruments & Methods in Physics Research; Oct. 13, 2003; Elsevier B.V.; pp. 674-686.
Amerio et al.; Dosimetric Characterizatin of a Large Area Pixel-Segmented Ionizatin Chamger; Med. Phus, 31 (2); Feb. 2004; Am. Assoc. Phys. Med.; pp. 414-420.
Eom et al.; "Characteristic of a PDP-Based Radiation Detector in Xe—He Mixture Gas"; Journal of Instrumentation; vol. 8; pp. C04005; Apr. 2013.
Lee et al.; "Simulation Study of Plasma Display Panel-Based Flat Panel X-Ray Detector"; IEEE Transactions on Nuclear Science; vol. 60, No. 2, pp. 908-912; Apr. 2013.
Eom et al.; "Feasibility Study of a Plasma Display-Like Radiation Detector for X-Ray Imaging"; IEEE transactions on Applied Superconductivity; vol. 20, No. 3, pp. 269-276; Sep. 2012.
Cho et al.; "A Hubrid Radiation Detector Based on a Plasma Display Panel"; Nuclear Instruments and Methods in Physics Research; A 609; 2009; pp. 172-176.
Any copies of information that are not included with this Information Disclosure Statement can be found in U.S. Appl. No. 15/404,713.

* cited by examiner

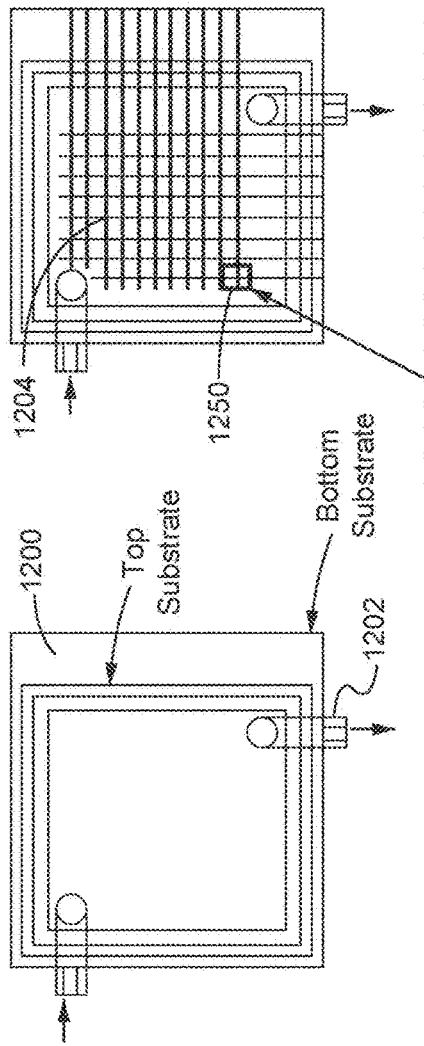
FIG. 12A
FIG. 12B
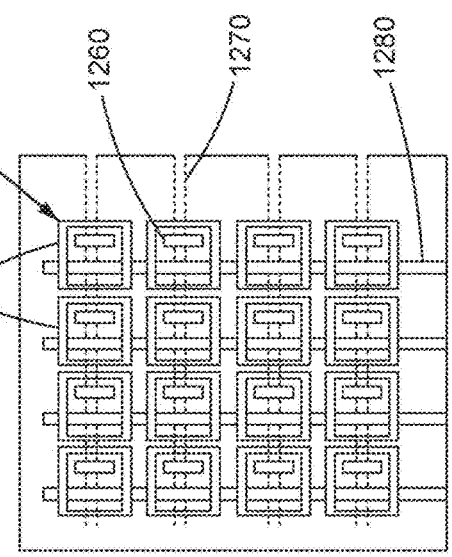
FIG. 12C
Pixels (1250) formed from segmented cathodes (1260) coming from cathode bus-bar (1270) on bottom surface up to top surface of back substrate and paired in close proximity to anode lines (1280) on top surface of back substrate.

ULTRA-THIN PLASMA PANEL RADIATION DETECTOR

CROSS-REFERENCE TO RELATED APPLICATIONS

This application is a continuation-in-part application of U.S. patent application Ser. No. 15/404,713, filed on Jan. 12, 2017, which is a continuation application of U.S. patent application Ser. No. 14/218,820, filed on Mar. 18, 2014, now U.S. Pat. No. 9,551,795, issued Jan. 24, 2017, which claims priority to U.S. Provisional Patent Application Ser. No. 61/852,426, filed on Mar. 15, 2013. The specifications of each of these applications is herein incorporated by reference.

GOVERNMENT LICENSE RIGHTS

This invention was made with government support under a Small Business Innovation Research ("SBIR") Assistance Agreement, Grant No. DE-SC0006204, awarded to Integrated Sensors, LLC, by the U.S. Department of Energy. The government has certain rights in the invention.

FIELD

One embodiment of the present invention is directed to the detection of radiation. More particularly, one embodiment of the present invention is directed to a plasma panel based detection of radiation.

BACKGROUND INFORMATION

Many useful applications, such as the detection of radioactive material and computer-assisted tomography ("CAT"), rely on the detection of photon radiation, known as X-ray and/or gamma-ray radiation. Both of these types of high-energy photon radiation cause ionization and for the purposes of this disclosure the two terms, X-ray and gamma-ray, are used interchangeably. In terms of the detection of such ionizing radiation, the spectral region of greatest interest for most of these applications generally falls between the energies of about 20 keV to 20 MeV. Other applications, including the detection of particle radiation from ion beam accelerators/colliders, cosmic ray generated minimum ionizing particles ("MIP"s), and neutrons from special nuclear materials ("SNM") used in nuclear weapons (e.g., enriched uranium or plutonium-239), rely on the detection of ionizing particles that can be either atomic nuclei (e.g., alpha particles), or subatomic (e.g., neutrons, protons and muons) in nature, and which can vary over a very broad energy range from less than 1 KeV to well beyond 1 TeV.

In order to detect ionizing radiation in the above spectral range of interest, a number of known sensing devices are commonly used. One of the earliest known electronic devices is the ionization chamber. Detection of radiation in an ionization chamber, such as a Geiger-Mueller ("GM") tube, is based upon electrical conductivity induced in an inert gas (usually containing argon, neon or helium as the main component) as a consequence of ion-pair formation. One currently widely used type of ionizing-particle radiation detector is the micropattern gas detector. These devices have been under continuous development for many years in high energy and nuclear physics. Detectors such as the Microstrip Gas Chamber ("MSGC"), Gas Electron Multiplier ("GEM") and Micromegas have many desirable properties as proportional gas detectors, but are operationally limited to gains within the proportional region in the range of $\sim 10^3$ to $10^6$.

A new class of radiation detectors, known as plasma panel sensors ("PPS"), have been introduced within the past decade and are derived from the technologies used in producing plasma display panels ("PDP") for television. Compared to conventional gaseous detectors, these devices, which can have significantly higher gain, fast response and very high position resolution, encompass some of the best features of GM tubes and conventional micropattern gas detectors. PPS based detectors are inherently digital in nature and operate in the high gain, non-linear (i.e. non-proportional) Geiger mode region. This feature is unique relative to other known high quality radiation detectors that are proportional in nature and as such are confined to operation in the linear region. As such, each cell or pixel in a plasma panel based radiation detector can be thought of as generating a micro-Geiger type discharge.

SUMMARY

One embodiment is an ultra-thin radiation detector that includes a radiation detector gas chamber having at least one ultra-thin chamber window and an ultra-thin first substrate contained within the gas chamber. The detector further includes a second substrate generally parallel to and coupled to the first substrate and defining a gas gap between the first substrate and the second substrate. The detector further includes a discharge gas between the first and second substrates and contained within the gas chamber, where the discharge gas is free to circulate within the gas chamber and between the first and second substrates at a given gas pressure. The detector further includes a first electrode coupled to one of the substrates and a second electrode electrically coupled to the first electrode. The detector further includes a first impedance coupled to the first electrode, a power supply coupled to at least one of the electrodes, and a first discharge event detector coupled to at least one of the electrodes for detecting a gas discharge counting event in the electrode. The detector further includes a plurality of pixels defined by the electrodes, each pixel capable of outputting a gas discharge counting event pulse upon interaction with ionizing radiation.

BRIEF DESCRIPTION OF THE DRAWINGS

FIGS. 12A-C illustrate an ultra-thin PPS with a second exhaust valve in accordance with one embodiment and a surface-discharge electrode structure in accordance with another embodiment.

DETAILED DESCRIPTION

Figure 1:
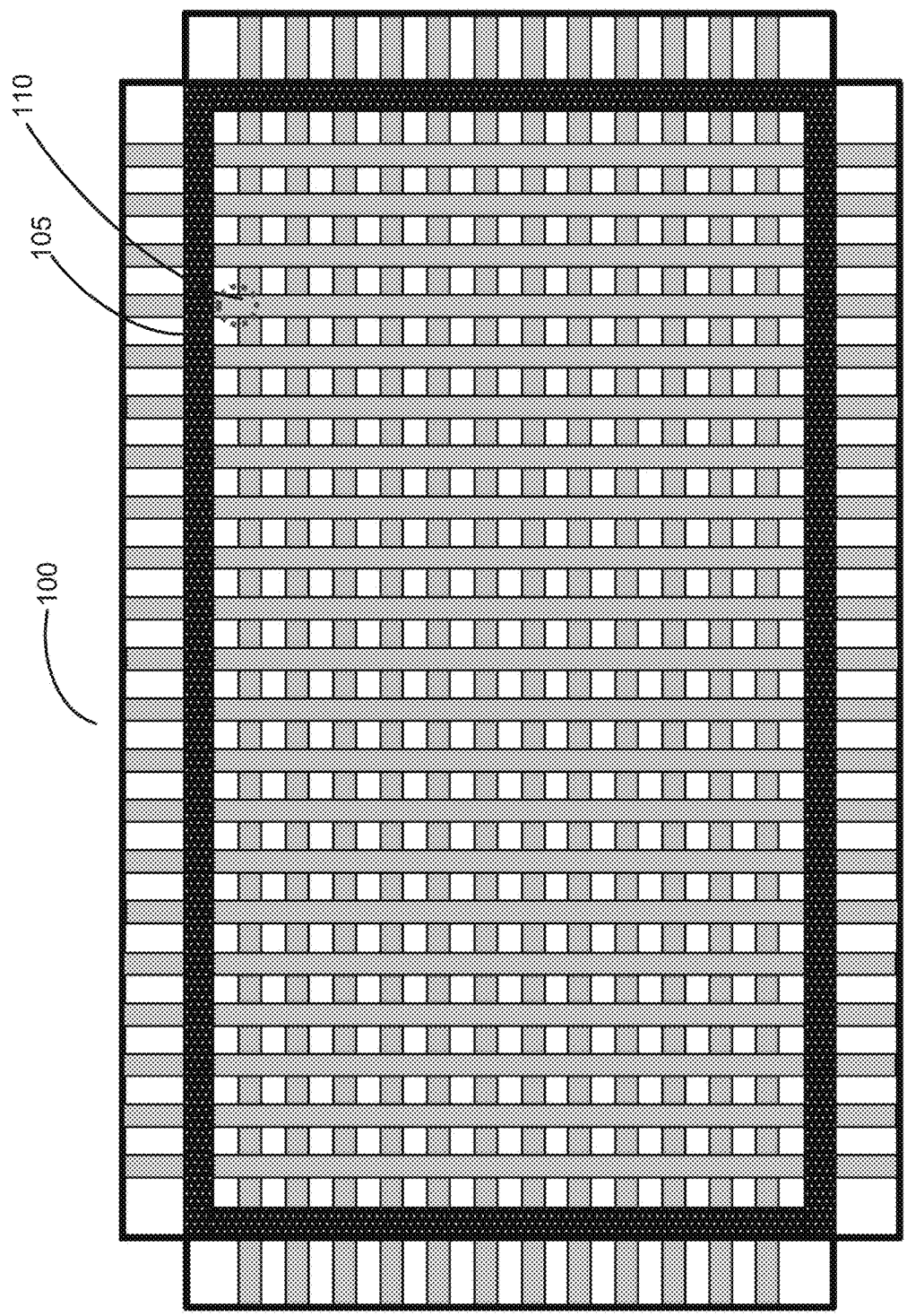
FIG. 1 illustrates a columnar-discharge PPS having a two-electrode structure in accordance with one embodiment.

One embodiment is an ultra-thin plasma panel sensor ("PPS") detector fabricated using extremely thin, low mass substrates. Embodiments can be used for the detection, tracking, identification, position sensing and/or imaging of ionizing particles, ionizing particle beams or photons generated by any means.

In general, the PPS in accordance with embodiments of the present invention differ from most other known gaseous micropattern particle detectors for at least the following reason:

Sparking and Gain: A recurrent problem with micropattern detectors which operate with gains of $\sim 10^4$ (and greater) is possible destructive sparking. The PPS is designed to typically be a higher gain, Geiger-mode device and should be effectively immune to destructive sparking. An inline current-limiting quench resistor associated with every PPS pixel, or pixel high-voltage cathode line, immediately drops the voltage at discharge and terminates the current pulse.

Spatial Resolution: Mature photolithographic and ion milling techniques can be used to deposit and pattern electrodes with micron-level precision and with cell pitches of less than 100 μm; current manufacturing capability already far exceeds this precision thus providing a direct path to high resolution PPS devices.

Fast Response and High Rates: Signal development depends on gas avalanche and streamer formation over a narrow gap. These processes are intrinsically fast, on the order of nanoseconds or less, depending on gas gap geometry, gas mixture, etc. Rate capability is determined by the cell recovery time, which can be made shorter by the addition of a suitable gas quenching component as used in Geiger tubes. In tests using commercial PDPs with large capacitances, recovery times are on the order of ~10 μsec. With pixel densities from hundreds to thousands of cells/$cm^2$, the hit rate capability can potentially reach ~100 $MHz/cm^2$.

Cost, Scalability, Electronics: PPS detectors can benefit from similar fabrication processes, materials and associated mechanical and electrical properties as large area PDPs. Current prices for 40-50 inch diagonal PDPs are ~$0.02 per $cm^2$. PPS readout electronics would be similar to those used in other high channel density, two coordinate detectors. The PPS high gain renders them intrinsically binary, generally obviating the need for an amplification stage and thus simplifying the front-end signal processing. Because of being fabricated on glass or ceramic substrates, high density, high speed electrode to integrated circuit interconnections can be achieved via low cost, chip-on-glass ("COG") type technology, such as that used on PDP and LCD displays.

For many of the uses described herein, fabrication of PPS structures in accordance with embodiments can utilize low cost materials and manufacturing processes, especially those developed for the fabrication of high resolution, flat panel displays such as PDPs, LCDs and OLEDs. Radiation detectors that are based on a PDP are known, for example, as disclosed in U.S. Pat. No. 7,332,726, and U.S. Pat. Pub. No. 2010/0265078, the disclosure of each of which is hereby incorporated by reference. For example, PDPs are mass-produced as large area (e.g., 1-2 meter diagonal) flat panel displays almost exclusively for HDTV television applications. Such panels currently sell for about two orders-of-magnitude less per unit area than the lowest cost photomultiplier tubes. However, the trend in industry is to build thinner and thinner display devices, especially for portable applications such as smart phones, tablets and laptop computers. The logical extension of this trend is the development of "flexible" high-resolution displays fabricated on flexible substrates such as flexible glass or plastics. Glass manufacturers have developed flexible glass for roll-to-roll processing in thicknesses ranging from about 25 to 200 microns. The new PPS configurations and embodiments described herein take advantage of this trend towards ever thinner substrates via new PPS device structures designed to achieve the lowest possible mass by incorporating ultra-thin materials (e.g., glasses, ceramics, metal foils and certain barrier coated plastic films), with some of these materials having a thickness in the range of 1 to 10 microns.

Embodiments of the present invention are directed to radiation detectors based on the plasma panel sensor for the purpose of realizing enhanced performance with respect to the detection of ionizing radiation in the form of both photons and particles. Such devices can be used for the detection, tracking, identification and/or imaging of ionizing photons or particles generated by any means. The ionizing particles to be detected by embodiments can include both neutral and lightly to heavily charged particles, spanning the range from relatively low energies in the range of keV to relativistic particles (e.g., hundreds of GeV and TeV). Some of the accelerator related applications for these detectors include: the detection, monitoring and/or profiling of protons and heavier ions such as carbon and neon ions in the treatment of cancer by hadron particle beam therapy; the detection of somewhat higher energy particles including protons for example for proton CT-imaging as an alternative to conventional X-ray based CT-imaging; the detection, monitoring and profiling of very large ionizing particles generated in radioactive ion beam ("RIB") accelerators; and the detection and tracking of subatomic ionizing particles such as muons generated at facilities such as the Large Hadron Collider ("LHC") at CERN. Other applications include the detection of particles or photons from radioactive sources including the detection of neutral ionizing particles such as neutrons. Additional applications include the detection of: UV, (ultraviolet) and/or VUV (vacuum ultraviolet) and/or soft X-ray photons generated by high temperature flames such as in gas or liquid or solid fuel based turbine engines used for generating electricity or in jet engines or by welding arcs or electron beams, etc., ionizing radiation including gamma-rays for applications in astronomy, ionizing radiation for oil and gas exploration and nondestructive testing, etc.

Embodiments include plasma panel radiation detectors that incorporate novel structures based on the use of very low mass, thin and ultra-thin substrates to minimize interaction with the incident radiation by the non-active device support materials in the radiation beam path. This requirement is especially important for particle and photon beam tracking applications or other such applications that require high transparency and minimal scattering of the incident particles or beam by the radiation detector itself. For example, medical radiation detectors that are positioned between the radiation source and the patient should generally be as transparent as possible with minimal scattering. Such scattering needlessly exposes the patient to additional radiation that serves no useful purpose; in fact the resulting radiation attenuation and scattering degrades the incident beam quality and typically also the image quality if the beam is used for diagnostic imaging purposes.

As disclosed, the term "thin" in one embodiment describes substrates with a thickness between approximately 0.65 to 1.3 mm, while the term "ultra-thin" is used to describe substrates with a thickness less than 0.65 mm which includes "flexible substrates" that typically define a thickness range of less than or equal to about 0.25 mm. However, "thin" may encompass "ultra-thin", and vice versa. "Low mass" may encompass both thin and ultra-thin. This description of thickness ranges for thin, ultra-thin and flexible substrates (flexible being a subcategory of ultra-thin) is somewhat arbitrary and material dependent, and as such should be considered as only an approximate guideline. For example, 0.2 mm thickness glass is described by Corning Incorporated as "flexible" and is sold in large diameter rolls and has been developed for roll-to-roll processing. Further, plastics and metals in this thickness are definitely flexible, but ceramics in a thickness of 0.2 mm are generally considered as being rigid and typically handled as such. In the case of metals and coated polymers, two subcategories under the ultra-thin or flexible description are metal "foils" and polymer "films", which typically describe flexible metal sheets in thicknesses of about 0.1 mm and thinner, and flexible polymers in thicknesses of about 0.3 mm or thinner.

The PPS device in accordance with one embodiment includes common components with plasma display panels ("PDP"s) developed for TV applications. PDPs are the core component of flat panel plasma televisions. Their design and production is supported by an extensive and experienced industrial base with approximately four decades of development. A PDP television comprises millions of cells per square meter, each of which, when provided with a signal pulse, can initiate and sustain a plasma discharge. Configured as a PPS radiation detector, each cell is typically biased to discharge in the Geiger mode when free-electrons are generated or injected into the gas by an external source of incident ionizing radiation entering or passing through the active pixel region. The PPS thus functions as a position-sensitive, highly integrated array of parallel pixel-sensor-elements or cells, each independently capable of detecting free-electrons generated in or deposited into the cell. The discharge is self-limiting and can be effectively quenched by a localized resistance associated with each pixel site, or, in cases of low incident radiation intensity, a localized resistance on each line. The device cell structure, gas mixture and circuitry are designed to isolate the gas discharge so that cell crosstalk, discharge regeneration and discharge spreading can be minimized if not eliminated, thereby enhancing the device capability as a high resolution, position-sensitive radiation detector. The device circuitry can detect when and where a gas discharge counting event pulse occurs, counting each such gas discharge pulse as an individual event and having an approximately equal value. For particle counting, imaging and radiation dosimetry applications, the PPS can provide a highly linear, accurate, and quantitative digital response to an amount of incident radiation based on either a sum of local individual counts for a restricted pixel area of illumination or on an all-inclusive total count of individual events across the entire device area of interest. Thus an amount of detected radiation is based on a total count of individual events. This linear response to the incident radiation intensity or flux is based on the fast, inherently-digital, particle counting nature of the PPS device which operates in the high gain, non-linear Geiger-mode response region. In general, the PPS in accordance with embodiments have a linear digital counting response, yet operate in the non-linear Geiger-mode response region PPS devices in accordance with embodiments detect charged particles primarily by direct gas ionization. FIG. 1 illustrates a columnar-discharge PPS 100 having a two-electrode structure in accordance with one embodiment. PPS 100 is an open structure and includes a plurality of electrode crossing points or paired proximity pixel locations (e.g., crossing point 110) separated by a gas gap. PPS 100 further includes a hermetic glass seal 105. Not shown is the internal pixel dielectric structure, or the internal gas-gap/discharge-gap panel spacers. PPS 100 has an open-cell orthogonal X-Y electrode structure. "Open-cell" means that there is no rib enclosure surrounding each cell, which makes these devices considerably easier to fabricate than PDPs for TV applications.

Figure 2:
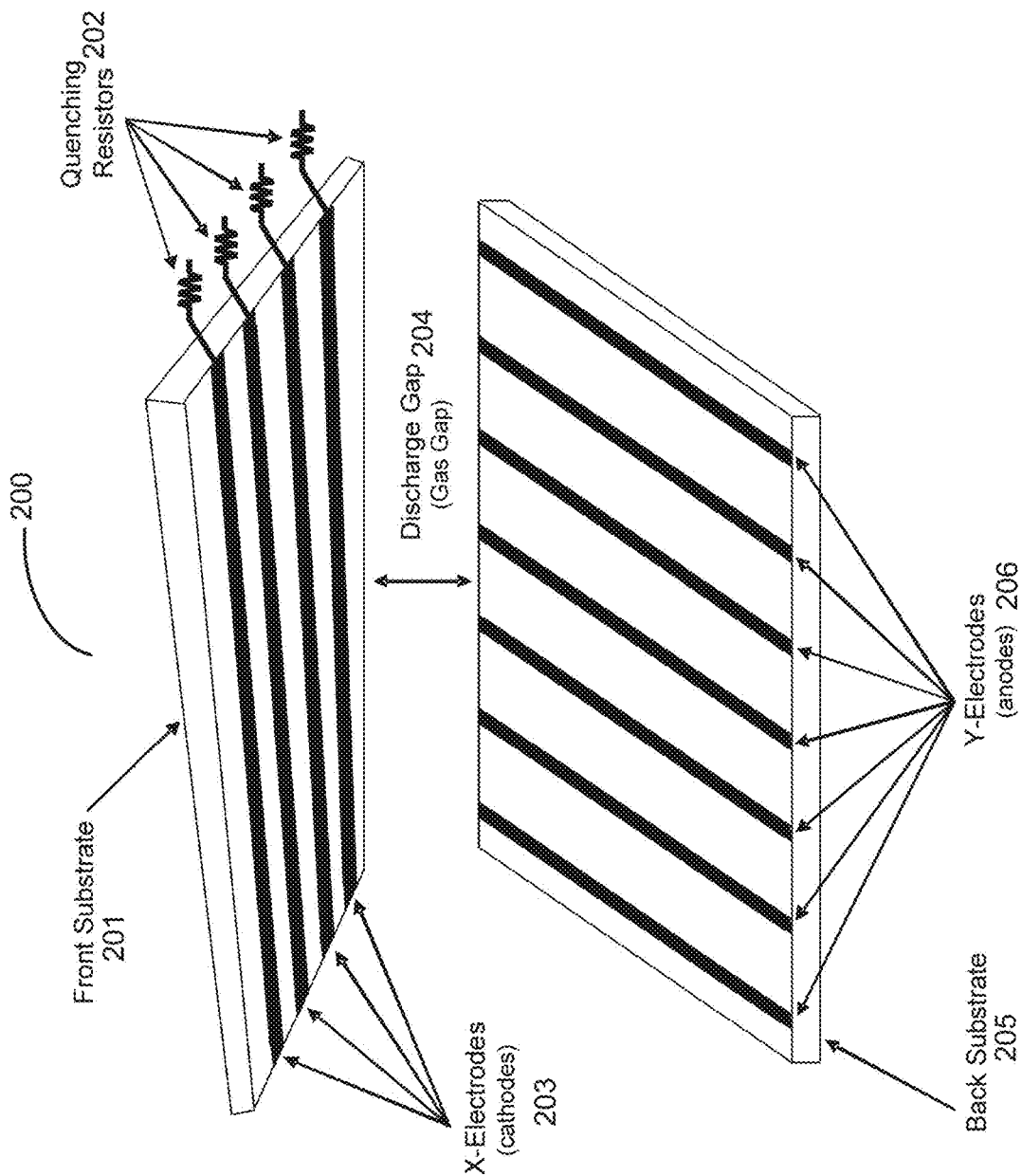
FIG. 2 is a perspective view of a columnar-discharge ultra-thin PPS with an "open-cell" electrode structure having a two-electrode, double-substrate, columnar-discharge ("CD") configuration in accordance with one embodiment.

FIG. 2 is a perspective view of a columnar-discharge ultra-thin PPS 200 with an "open-cell" electrode structure having a two-electrode, double-substrate, columnar-discharge (CD) configuration in accordance with one embodiment. PPS 200 includes a front substrate 201, a back substrate 205, X-electrodes 203 and Y-electrodes 206. PPS 200 further includes quenching resistors 202 and a discharge gap 204. In other embodiments the panels also include an "open", thick-film, dielectric surrounding window cell layer (not shown) deposited on top of the Y-electrodes. The substrates can be glass, ceramic, fused silica, glass-ceramic, sapphire, etc. Flexible glass substrates that are commercially available in thicknesses from 25 to 200 microns thick, and fused silica and ceramic substrates that are available at a minimum thickness of about 125 microns, can be used with some embodiments.

The discharge occurs in the volume defined by the intersection of the front column electrodes 203 (e.g., high voltage-cathodes) and the back row electrodes 206 (e.g., sense anodes) as shown in FIG. 2. With large gas-gap embodiments, the entire cell volume will be active and ion pairs created anywhere in this gas volume should be drawn by the high field gradients to the nearest cell electrodes that define the localized discharge space and hence a 2-dimensional position location.

Figure 3:
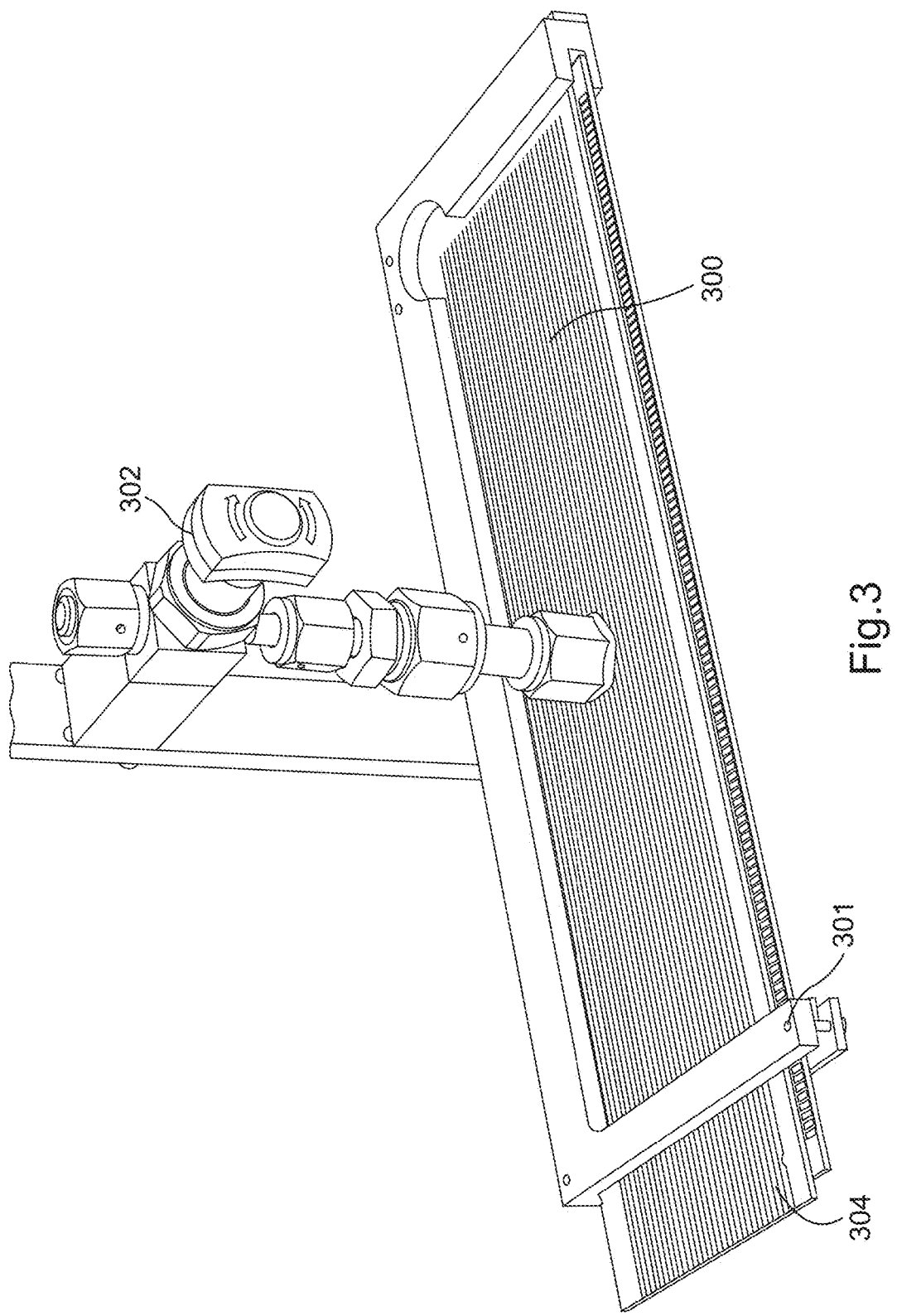
FIG. 3 illustrates a columnar-discharge PPS test panel (i.e., the orthogonal electrode structure in FIG. 1) after modifying a commercial two-electrode, DC-type, glass PDP in accordance with one embodiment.

FIG. 3 illustrates a columnar-discharge PPS test panel 300 (i.e., the orthogonal electrode structure in FIG. 1) after modifying a commercial two-electrode, DC-type, glass PDP in accordance with one embodiment. Panel 300 in FIG. 3 is attached to a removable aluminum frame 301 for mechanical integrity, which is fitted with a sealed, high-vacuum, shut-off valve 302 to allow multiple fills of different gas mixtures and pressures. The panel active cell area in this embodiment is 8.1×32.5 cm and was made with 2.3 mm thick soda-lime glass substrates. The electrode/cell pitch of the panel shown in FIG. 3 is 2.5 mm. Other tested devices have a 1.0 mm cell pitch. A readout electronics card (not shown) mounts on the horizontal anode lines and the signal is picked off using a 50 ohm termination resistance. A high-voltage bus feeds the vertical cathode lines via a single quench resistance per line as shown if FIG. 2.

The thin and ultra-thin PPS embodiments disclosed herein can address an expanded set of radiation detection and imaging applications in providing higher performance in terms of higher efficiency, reduced scattering, and/or improved tracking and position resolution capability. In particular, panel 300 shown in FIG. 3 has 2.3 mm thick glass, which can cause significant scattering of low to medium energy incident particles, thus the need for much thinner substrate PPS devices for applications that require minimal incident particle scattering. Because the boundary or distinction between "thin" and "ultra-thin" materials overlaps, and the numerical definitions provided above are somewhat arbitrary and material dependent, the two terms can be used interchangeably so that the term "ultra-thin" also can encompass "thin" devices, as defined above, and vice versa. Thus, like other PPS devices, the new ultra-thin configurations described herein inherit from PDPs several key attributes attractive for ionizing radiation detectors. For example, the basic PPS device can be fabricated from intrinsically rad-hard materials and sealed with a stable gas mixture, thus resulting in a device with extensive lifetime. However for those applications requiring the lowest possible mass and the thinnest possible construction, hermetic sealing may not be practical and periodic gas exchange via either a gas valve system such as shown in FIG. 3, or a gas flow-through system or a gas filled chamber enclosure as described below may be required. This is because many ultra-thin substrate materials are not sufficiently impermeable to ambient gaseous diffusion into the device active gas discharge region over a long period of time. For example, at a thickness of 1 micron there is no substrate that is sufficiently impermeable to gaseous diffusion over a time period measured in years for making a stable hermetically-sealed PPS device having a small gas volume. Similarly there is no known substrate material with a thickness of a few microns that can be self-supporting over an unsupported area on the order of one or more square inches without noticeable surface distortion/bending under a pressure differential that can approach one atmosphere.

Embodiments provide solutions to the above described problems by enclosing the ultra-thin PPS within an ultra-thin single or multi-walled window enclosure having the same gas composition and pressure both inside (i.e., internal) and outside (i.e., external) the PPS front and back substrate structure. In this manner, gaseous diffusion into the PPS will not change the gas composition, nor would there be a pressure differential if the enclosure is properly designed as either a gas-flow system or a periodic gas exchange static system with the same gas composition and gas pressure distributed between the wall windows and throughout the enclosure as within the PPS. In general, the outer-most wall windows facing the external ambient atmosphere would distort to some extent due to the presumed pressure differential, but if properly designed by means of either minimizing the pressure differential or by using a multi-walled window structure with the same pressure inside the chamber as between the window walls, the inner-most wall windows should be able to remain almost perfectly flat. In general, in embodiments, the outer-most wall windows of the PPS enclosure/chamber is functionally sacrificial so as to maintain the planarity and uniformity of the internal gas gap between the front and back ultra-thin PPS substrates. The ultra-thin wall window enclosure/chamber structure can employ, for example, ultra-thin aluminum (e.g. 13-25 microns) or titanium foil (e.g., 6-13 microns) windows, or an even thinner high-strength alloy foil such as cobalt-based Arnavar™ or Havar® foil, or perhaps even a lower mass coated or metalized polymer film window. For example, double-sided metalized 1.5 micron thick PEN film (i.e., polyethylene naphthalate) is commercially available, as is double-sided metalized 6 micron thick BoPET (i.e., biaxially-oriented polyethylene terephthalate which is Mylar®), PEEK (polyether ether ketone), PEI (polyetherimide), etc. The use of metalized or otherwise coated polymer films as opposed to an uncoated polymer window is to minimize gas diffusion/permeation through the base polymer. This because coated polymer films are able to reduce gas diffusion and permeation by orders-of-magnitude compared to the base polymer. The most common example of this is helium filled balloons which almost always use an aluminized barrier layer coated on a polymer base film (e.g., 0.001" thick Mylar® or PET) to prevent rapid diffusion of the helium out of the balloon.

Figure 4:
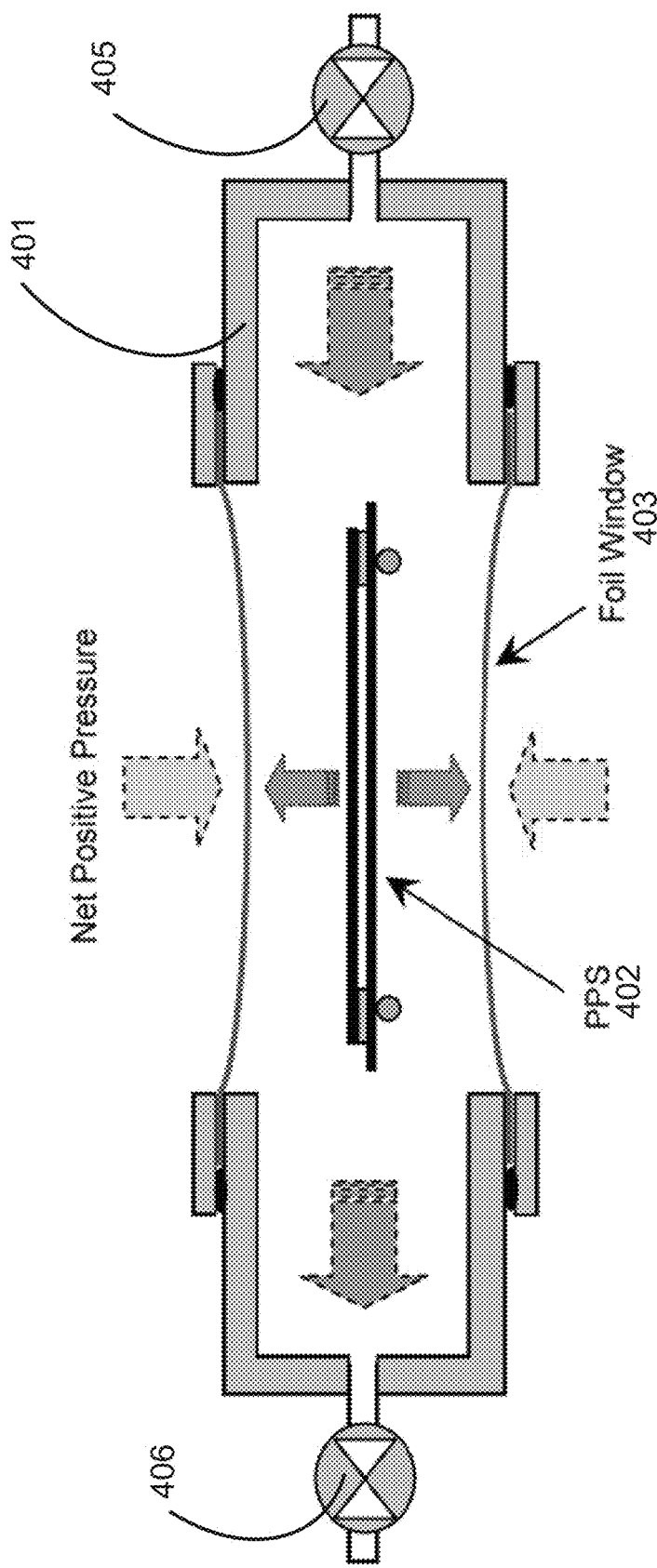
FIG. 4 is a side view of an ultra-thin PPS detector contained within an ultra-thin window gas chamber enclosure with foil windows in accordance with one embodiment.

FIG. 4 is a side view of an ultra-thin PPS detector 402 contained within an ultra-thin window gas chamber enclosure 401 with foil windows 403 on two opposite walls in accordance with one embodiment. PPS 402 (i.e., an "internal" radiation detector) is not hermetically sealed, but instead open to the gas atmosphere of the chamber and at the same pressure as the chamber 401 which can have an optional gas regulation system attached to control the internal gas pressure. Gas input 405 and exit valves 406 control the gas flow, which is maintained close to the ambient pressure. A slightly negative chamber pressure is shown in FIG. 4, but it could also be slightly positive.

Figure 5:
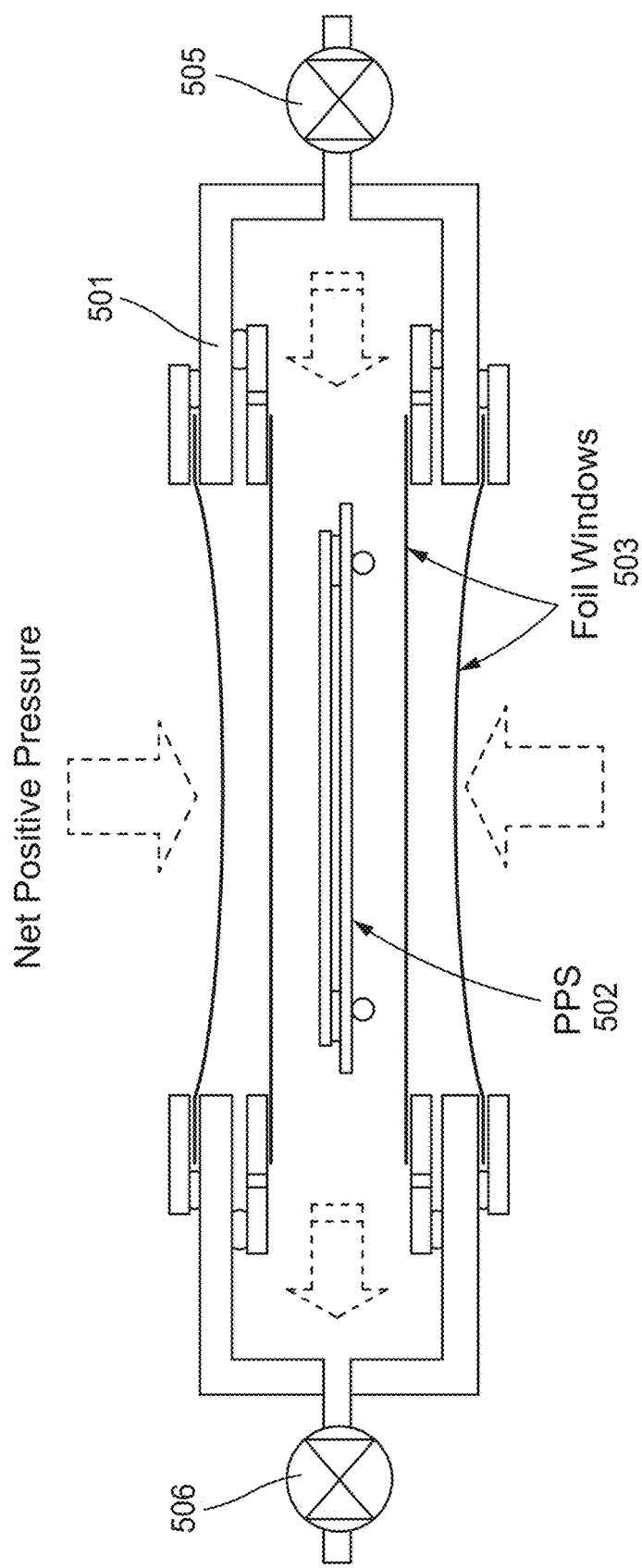
FIG. 5 is a side view of an ultra-thin PPS detector contained within an ultra-thin window gas chamber enclosure with double foil windows in accordance with one embodiment.

FIG. 5 is a side view of an ultra-thin PPS detector 502 contained within an ultra-thin window gas chamber enclosure 501 with double foil windows 503 in accordance with one embodiment. PPS 502 is not hermetically sealed, but instead open to the gas atmosphere within the chamber and at the same pressure as the controlled chamber pressure. Gas input 505 and exit valves 506 control the gas flow, which is maintained close to the ambient pressure. A slightly negative chamber pressure is shown in FIG. 5, but it could also be slightly positive.

Figure 6:
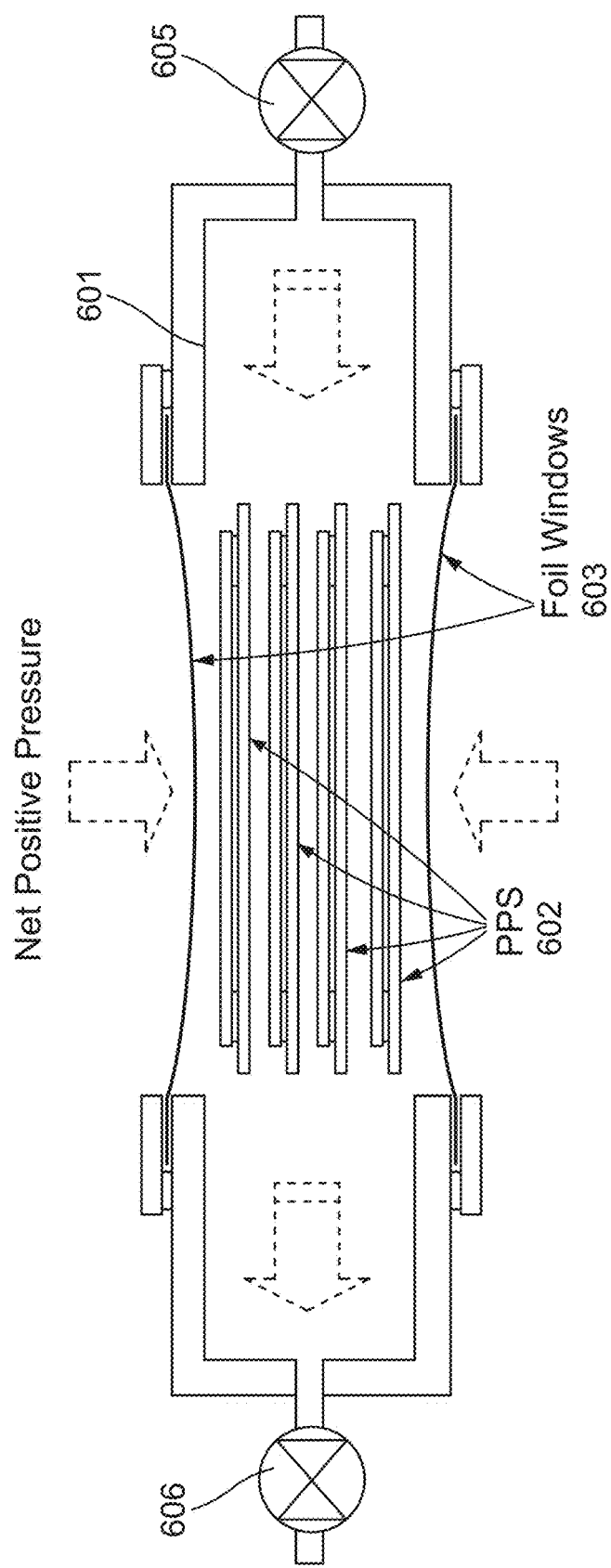
FIG. 6 is a side view of a vertical stack on internal ultra-thin PPS detectors contained within an ultra-thin window gas chamber enclosure with foil windows in accordance with one embodiment.

FIG. 6 is a side view of a vertical stack on internal ultra-thin PPS detectors 602 contained within an ultra-thin window gas chamber enclosure 601 with foil windows 603 in accordance with one embodiment. PPS detectors 602 are not hermetically sealed, but instead open to the gas atmosphere and at the same pressure as the controlled chamber pressure. PPS 602 is in the form of a vertical stack. Gas input 605 and exit valves 606 control the gas flow, which can be maintained close to the ambient pressure or the valves can be shut with no flow to maintain a stable static gas condition and then occasionally opened as needed to change the gas pressure or exchange the gas volume. A slightly negative chamber pressure is shown in FIG. 6, but it could also be slightly positive.

In addition to ultra-thin foils and metalized polymers serving as the outer-most walls of the external PPS enclosure, such as enclosure 401 of FIG. 4, both metal foils or metalized polymers films could also serve as the cover plate substrate for the PPS device itself within the described enclosures. For this latter application, these materials would work with both columnar-discharge ("CD") and surface-discharge ("SD") configured PPS structures or embodiments.

Ultra-thin, UV-sensitive, PPS photon detectors can be fabricated with the addition of a suitable internal photocathode or photoanode layer on ultra-thin substrates having high UV (ultraviolet) or VUV (vacuum ultraviolet) transmission. For example, the ultra-thin "flexible" glasses disclosed above are typically of an aluminoborosilicate type composition, and in thicknesses on the order of 100 microns have good UV transmission down to about 260 nm. Alternatively, good VUV transmission down to about 155 nm can be achieved using high quality, ultra-thin fused silica substrates, or extended further for VUV transmission down to about 140 nm using the same thickness sapphire crystal substrates. Both fused silica and sapphire are readily available in thicknesses of 127 microns in 4" diameter substrates, and in thicknesses down about 25 microns in smaller diameter substrates. Because of their high temperature materials construction, such PPS detectors having high UV-VUV transmission can operate in harsh, high temperature environments in excess of 200° C., and perhaps in excess of 300° C. An example of one such commercial application for this type of detector would be a gas turbine flame-out sensor to monitor the UV signal produced by the high temperature flame of a gas turbine engine used for electrical generation. The purpose would be for the sensor to "immediately" send an electrical signal to shut off the gas supply under conditions of a gas flame-out in which the flame and accompanying UV signal are simultaneously extinguished, and an explosion could result if the gas supply were not cut off immediately.

The ultra-thin PPS detectors as disclosed in accordance with embodiments can lead to significantly improved performance for many applications over the current generation of solid state and gaseous detectors, including: resistive plate chambers ("RPC"), cathode-strip chambers, gas electron multipliers ("GEM"), microstrip gas chambers/counters, Micromegas, etc. For example, important scientific and medical applications could be addressed by ultra-thin PPS detectors including: low energy, heavy particle, active pixel beam monitors; low attenuation and low scattering beam monitors for both photon and hadron particle beam therapy; and particle (e.g., proton) CT imaging to complement or even replace conventional X-ray CT imaging. For particle tracking including CT imaging, the use of ultra-thin devices allows a vertical stack of two or more such devices, such as shown in FIG. 6, to track an ionizing particle that transits though the thin particle stack.

Figure 7:
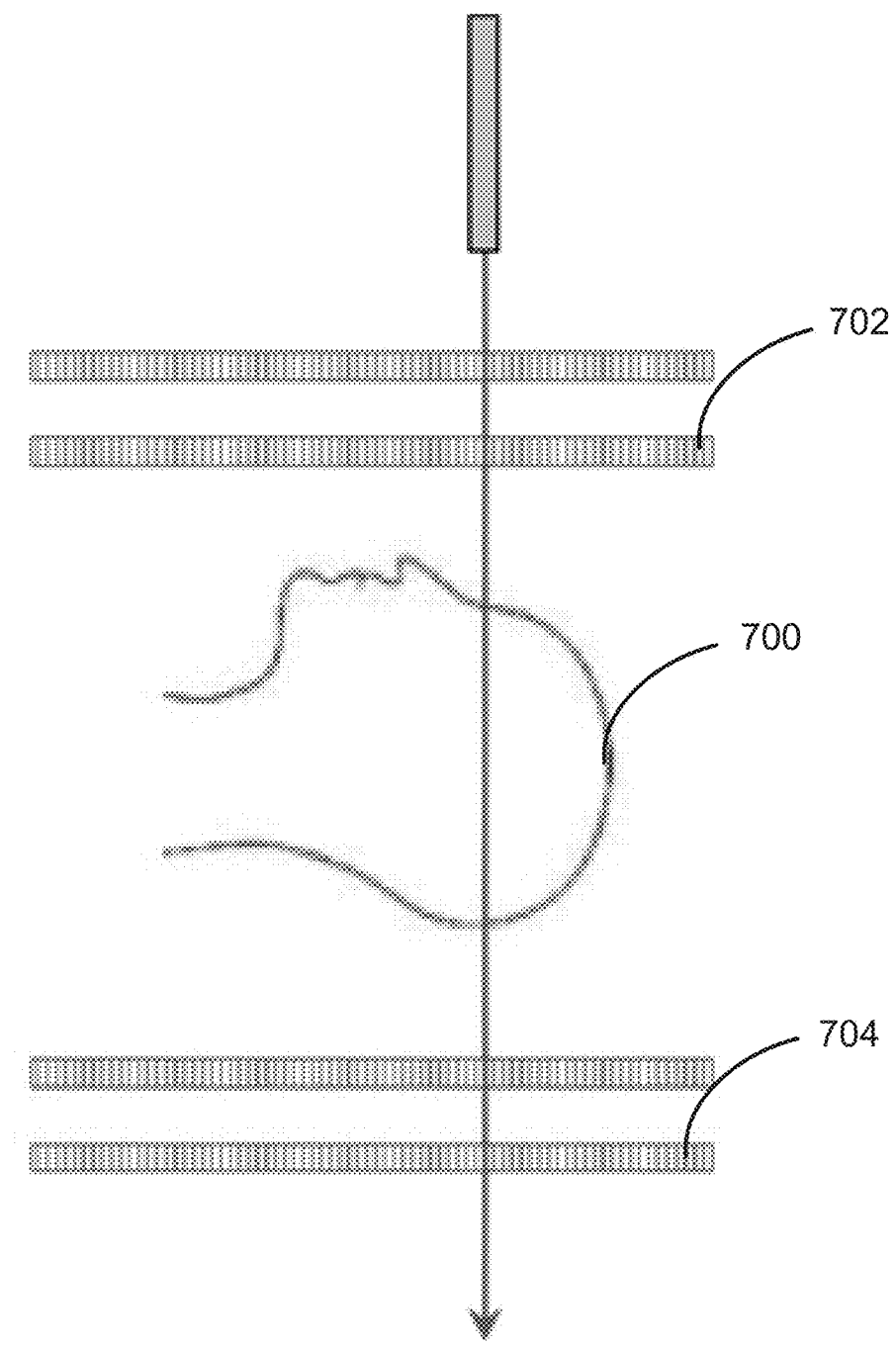
FIG. 7 illustrates the use of embodiments of the invention for medical CT imaging.

FIG. 7 illustrates the use of embodiments of the invention for medical CT imaging. As shown in FIG. 7, a patient 700 is positioned between a sandwich of ultra-thin vertically stacked PPS's, which could be a PPS detector system similar to that shown in FIG. 6, with at least two PPS detectors 702 in front of the patient and at least two such detectors 704 behind the patient, thus being able to track a particle as it enters and leaves the patient. Such a system could be used for particle CT imaging, including proton CT imaging.

The refillable PPS test panel of FIG. 3 during testing has held gas mixtures that have operated for more than a year after the shut-off valve was closed without any noticeable change in radiation detection performance. Similarly, embodiments employ periodic gas filling and "sealing" by closing the shut-off valve or valves on an ultra-thin PPS gas enclosure chamber such as shown in FIGS. 4, 5 and 6, without having to maintain a continuous gas flow system. Although not "hermetically" sealed, such a valve-sealed chamber can operate for many months if not longer before needing to be refilled. In another embodiment, a small gas reservoir of the discharge gas can be maintained either within or attached outside the PPS enclosure chamber with an associated gas pressure regulation system that could maintain a constant internal gas pressure regardless of ambient pressure variations. Alternatively the internal gas pressure could be dynamically maintained to approximately match the ambient pressure to minimize distortion of the ultra-thin chamber windows. In this later embodiment, the chamber is able to be self-calibrated with respect to operating voltage efficiency as a function of internal device pressure. Embodiments rely on the majority host component to be one of the inert gases: He, Ne, Ar, Kr, or Xe, or a very stable host gas such as $CF_4$ or $N_2$, while one or more minority components could be either another inert gas or a suitable Penning or quench gas, for example: $CO_2$, $CF_4$, $C_2F_6$, etc., including Geiger tube type quench gas compositions.

As disclosed, embodiments of the PPS utilize elements of construction of the PDP. PDPs consist of arrays of electrodes deposited on glass substrates, separated by a gas discharge gap. The electrode plus gap configuration constitute a cell or pixel. Commercial PDPs are comprised of millions of cells per square meter, each of which can initiate and sustain a localized plasma discharge almost indefinitely at a typical "on" rate of 20 to 50 kHz. PDPs have been produced as both DC-type and AC-type units. Discharge termination in a DC-type PDP is aided by a quench resistor, while AC-type units exploit the gap field reversal produced within dielectric layers deposited over the discharge electrodes. The essential structural components of a PPS include the electrode materials, a suitable substrate (e.g., glass or ceramic), dielectric grids or windows or cavities, spacer plates or frames, strips, rods, balls, or a spacer cavity/hole plate structure typically of glass or ceramic or glass-ceramic, and the gas mixture that fills the gap between the two substrates and contained to form the panel or panel enclosure/chamber.

Embodiments of the PPS cell are biased to discharge when free-electrons are injected into or created in the gas. Such electrons then undergo rapid electron avalanche multiplication, producing streamers that lead to a plasma discharge confined to the local pixel cell space. For a useful PPS device this process is self-limiting and self-contained by various means, one of the most important being an effective quench gas in combination with a localized impedance at each cell or on each line. The total charge available to produce a signal is limited by the effective cell capacitance. The stored charge limits the maximum gain. The gain therefore depends on details of cell geometry but likely exceeds $10^6$, because for panels tested to date the unamplified discharge signal has been in the tens of volts, so high in fact that significant attenuation has been needed for the readout electronics. A typical 42" diagonal, high resolution PDP-TV (i.e., 1080p) has a cell pitch of about 160 microns and a gas gap of approximately the same amount, although PDP cell pitches of 109 microns have been made for smaller size (i.e., 21-inch diagonal) higher resolution military display applications. Because of the small electrode gaps, large electric fields typically arise with something on the order of about a thousand volts of bias. The cell is operated above the proportional mode and could be thought of as a micro-Geiger counter. The signal pulse is essentially independent of the number of initiating free electrons, rendering the PPS as intrinsically digital.

Embodiments can have applications to hadron particle therapy, proton CT-imaging and robotic surgery. Cancer is the second-largest cause of death in the U.S., and approximately two-thirds of all cancer patients receive radiation therapy at some point during their illness. The majority of radiation treatments are still performed with linear accelerators ("linacs") that generate energetic electron beams and X-rays. However, in recent decades particle beam therapy using proton and carbon ion beams has rapidly evolved into a new frontier in cancer therapy.

Although existing technology, such as intensity modulated radiation therapy (IMRT) with photon (X-ray) beams, allows delivery of a well-defined, conformal dose to the target (tumor) volume, this can only be accomplished by directing the beams from multiple angles. Consequently, large volumes of normal tissue are exposed to low doses of radiation from the multiple X-ray beams entering and leaving the body, increasing the risk for long-term side effects including secondary cancers.

Particle beam radiation therapy offers advantageous physical-dose distributions (protons and heavier-ion beams) and potential for higher biological effect in the target (heavier-ion beams) as compared to photon radiotherapy. A considerable body of experimental and clinical, treatment-based evidence indicates that in certain settings particle beams might be more effective in treating cancer as compared to the most sophisticated photon-based therapies, while significantly reducing the volume of normal tissue irradiated. One important requirement is the ability to provide detectors that afford single-particle registration at high data rates with a high degree of uniformity and minimal interference with the particle beam. This would allow performing proton or ion CT prior to treatment and 2-D proton/ion radiography during treatment for integrated range verification, along with beam monitoring that has minimal interference with the primary beam. The ability to track individual particles at high rates with thin or ultra-thin tracking detectors is therefore critical for particle or proton CT imaging. More specifically, the registration of individual particles allows it to decide which proton histories to use for image reconstruction and to predict their most likely path through the patient. Based on these principles, images of high quality can be reconstructed with much lower dose compared to X-ray CT technology and affording a much better prediction of particle beam range in tissues. One major disadvantage of the currently available tracking detectors for this application is their limitations in size. Current silicon wafers are not available larger than 6 inches (15 cm), and therefore, large area detectors have to be built from many smaller detector tiles. This is seen as a major limitation of the current proton imaging technology both for CT and radiography. Similar limitations exist with such large-area sensors for intensity, position, and profile monitoring of particle beams during therapeutic delivery. Here it is very important to have detectors with high physical uniformity and minimal water-equivalent thickness to avoid spoiling the therapeutic beam properties. Embodiments of the ultra-thin-PPS as disclosed constitute a family of detectors that could be ideal for these applications.

The disclosed PPS embodiments have the potential to allow particle beam radiation therapy to realize its fullest potential and to be used in future clinical particle beam radiation therapy facilities. In addition to particle beam therapy and proton CT imaging, the described embodiments have broad implications for other fields that would greatly benefit by ultra-low-mass detectors, such as the detection of high mass, low energy particles for basic nuclear physics research, as well as for high energy physics research and neutron detectors with low gamma sensitivity.

For ion beam medical imaging applications, PPS detectors on the order of 40×40 cm (i.e., active area) can be designed to satisfy the need for most large-field radiography and proton CT detectors. For such applications, a variety of embodiments would be based on an ultra-thin enclosure or chamber, which itself would contain one or more ultra-thin (i.e., ultra-low-mass) PPS devices, as shown in FIGS. 4-6. The thinnest glass used for commercial PDP devices is 1.6 mm, as all PDPs must maintain a hermetic seal and be thick enough to withstand ambient pressure differences without suffering glass bending/distortion resulting in non-uniformity of the gas discharge gap. However, most of the embodiments disclosed herein employ thin and ultra-thin substrates based on ceramics, flexible glass, foils and coated polymer films. For example both fused silica and sapphire (R-plane $Al_2O_3$) are readily available in 4" diameter disks in a 0.127 mm thickness and available in thicknesses down to about 0.025 mm in smaller diameter sizes. Flexible glass is available in much larger substrate sizes (e.g., large diameter rolls of several feet in width) down to the same thickness of 0.025 mm, and metal foils and coated polymer films are readily available in thicknesses of less than 0.005 mm. Embodiments can employ such ultra-thin substrates because they can be supported by an internal, or external, or combined (i.e., sandwich) internal/external grid-support structure, or they can be packaged within an ultra-thin window chamber enclosure that employs similar ultra-thin metallic foil or coated polymer films for the top, or top and bottom, wall structures within an innovative static or dynamic gas flow system that maintains the chamber and panel at the same pressure regardless of the foil distortion due to the external pressure difference, as shown in FIGS. 4-6. Because there should be "zero" pressure differential inside versus outside the panel front and back substrates when packaged within the described ultra-thin window chamber enclosure, such devices should have extremely uniform gas discharge gaps.

The disclosed embodiments have low mass and are inherently uniform with high temporal and spatial resolution. For example, temporal resolutions of a few nanoseconds have been demonstrated, as has a spatial resolution of 0.7 mm in PPS devices with 1.0 mm pixel granularity (i.e. cell pitch). Embodiments having sub-millimeter image resolution combined with ultra-thin device structures and high particle detection efficiencies can make these detectors ideal for a number of particle tracking and beam monitoring applications including CT diagnostic imaging and particle beam therapy. The implications are quite profound as particle CT imaging could potentially eliminate the use of many if not most X-ray technology modalities. For particle beam therapy, all of the imaging and treatment could be performed entirely with charged particles, for example protons within an energy range of approximately 50 to 500 MeV. The conversion of Hounsfield values produced by X-ray CT, to calculating the particle stopping power, is a well-recognized problem of proton and ion beam radiation therapy that frequently prevents the stopping of protons or ion beams in front of a critical structure, thereby losing a major promise of the Bragg-peak property of particle beams in cancer therapy.

It has long been known that particle imaging is an order-of-magnitude more dose-efficient than X-ray based imaging, making routine use for image guidance a realistic possibility. Effective large area, low attenuation detectors such as ultra-thin PPS devices in combination with low-intensity charged particle technology can allow diagnostic particle CT imaging with its faithful reproduction of electron density distributions to become available. This will allow very low doses (i.e., sub-mSv for CT and µSv for radiography) for example for screening studies (lung cancer, breast cancer, kidney stones, etc.) as well as for real-time, robotic, non-interventional surgery.

Two main advantages for proton-CT imaging are order-of-magnitude reduction in radiation exposure (i.e., ~90%), and order-of-magnitude improvement in temporal resolution. For example, proton-CT ("pCT") imaging should provide images similar to X-ray CT images, but with about a 90% reduction in radiation exposure to the patient. This is significant because CT-imaging causes cancer in some patients. For example, a conventional abdominal CT-scan (with contrast) is equivalent to about 200 chest X-rays and will cause something on the order of between 1-in-500 to 1-in-1000 new cancers per patient scan.

In comparing X-ray CT to pCT imaging, approximately similar spatial resolution and area/volume coverage is expected, but with better contrast/density discrimination, much faster time resolution, and order-of-magnitude lower radiation dosage at potentially comparable cost. In terms of time resolution, the fastest X-ray CT commercial scanner (e.g., the 640 slice Toshiba Aquilion ONE VISION) can do a rotation in about 0.3 seconds, which although seemingly fast is not fast enough to prevent some potential image blurring from heart movement during contraction, whereas pCT imaging has the potential to capture an image perhaps a 1000 times faster (~0.0003 seconds).

Unlike most solid-state radiation detectors, PPS detectors in accordance with embodiments are inherently rad-hard, and can be designed to detect both high-energy X-ray beams and particle beams with minimal beam interference (e.g., scattering). PPS detectors have the potential to measure the incident beam intensity distribution and beam shape in real-time as the patient is undergoing cancer treatment, while being almost transparent to the beam transmission through the PPS detector. The beneficial result is that use of PPS detectors should result in very little deviation of the beam on its path to the target tumor site (i.e. beam scattering to adjacent healthy tissue).

The benefits of very low radiation dosage coupled with very high temporal resolution enables a new type of interventional radiology (neurovascular, hepatic, etc.) or particle-CT fluoroscopy that could lead to real-time, non-interventional robotic surgery which could be revolutionary for a number of surgical procedures. For example, real-time pCT could enable image-guided robotic surgery via a threaded catheter which could repair the heart or other organs non-invasively. This is not possible using X-ray CT imaging because the patient would be exposed to too much radiation during such a procedure and the temporal resolution of X-ray CT is not fast enough. For heart surgery this capability could enable time-resolved (i.e., 4-D) real-time cardiovascular CT surgery, but could also be used for other types of cardiology (e.g., coronary, structural, electrophysiology, etc.) as well as real-time, image-guided robotic endoscopy procedures, etc.

Figure 8:
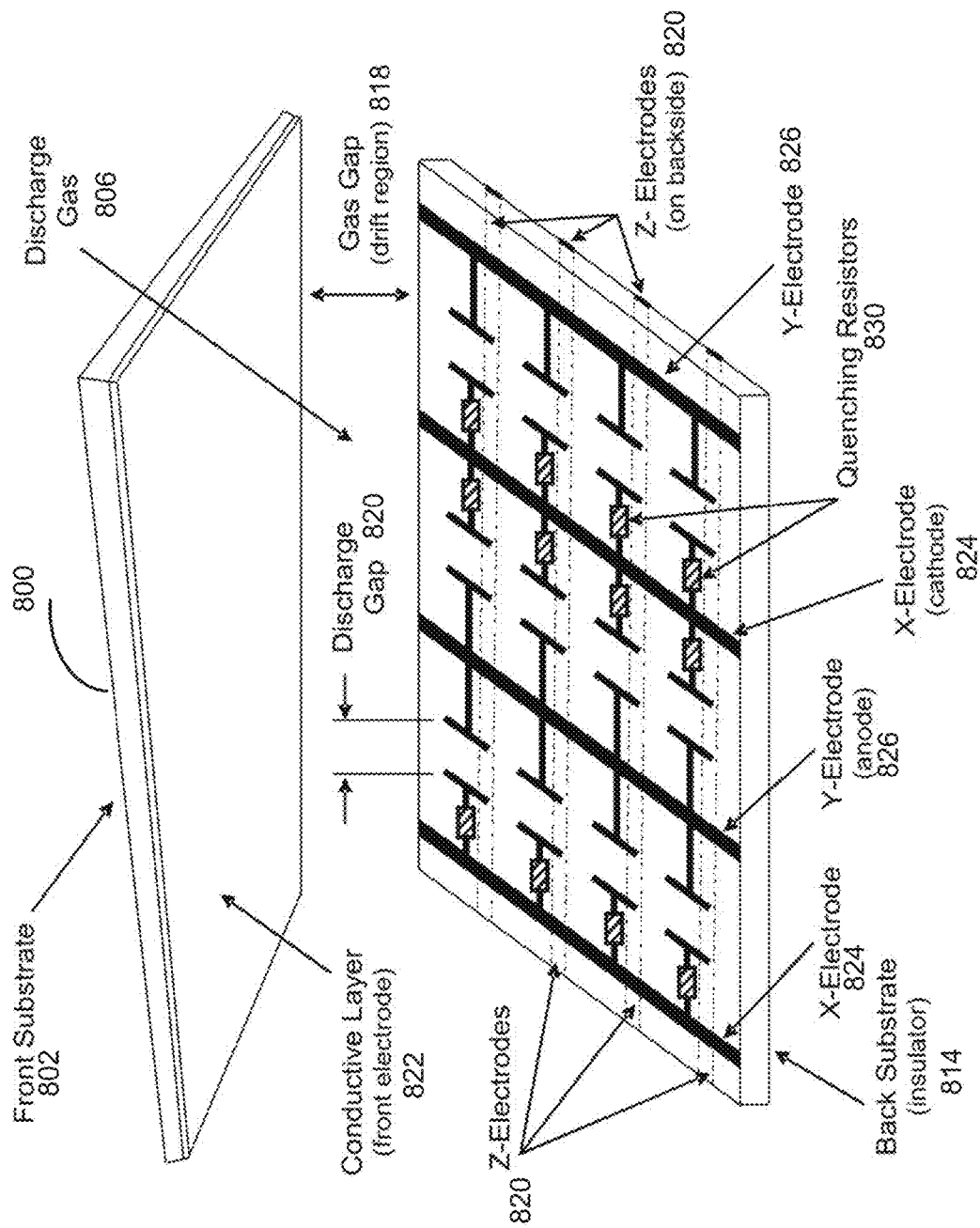
FIG. 8 is a perspective view of an ultra-thin surface-discharge PPS pixel array in accordance with one embodiment.

In one embodiment, the ultra-thin PPS uses a discharge-gap closely coupled to an orthogonal ion-pair creation drift region 818. FIG. 8 is a perspective view of an ultra-thin surface-discharge PPS pixel array in accordance with one embodiment. The front substrate 802 contains a drift-field electrode 822. The X and Y lines, 824, 826, on the back substrate 814 define cells with embedded resistors 830 and avalanche discharge gap regions 820. The front substrate could be made off an ultra-thin metalized polymer film, or an ultra-thin metalized ceramic membrane such as $Si_3N_4$ or alumina, or an ultra-thin metalized flexible glass or fused silica, or an ultra-thin metal foil such as an aluminum or titanium or cobalt-alloy foil.

Figure 9:
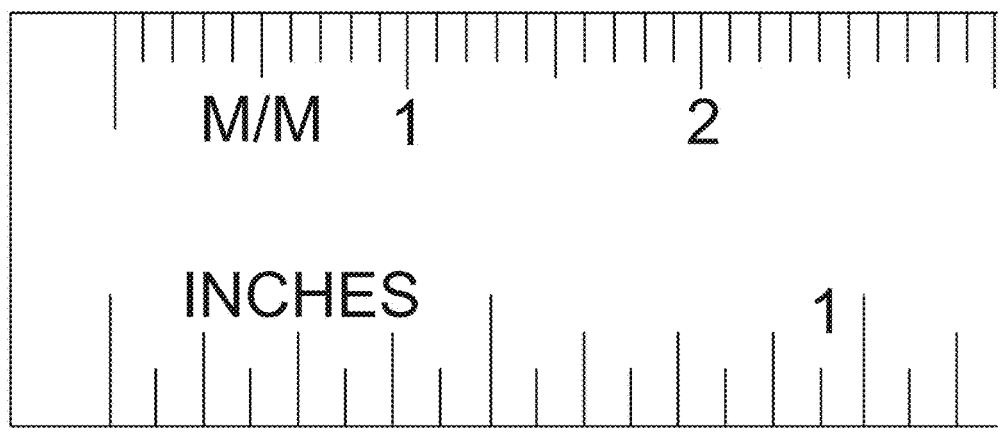
FIG. 9 illustrates a fabricated alumina grid-support plate in accordance with one embodiment.
Figure 9:
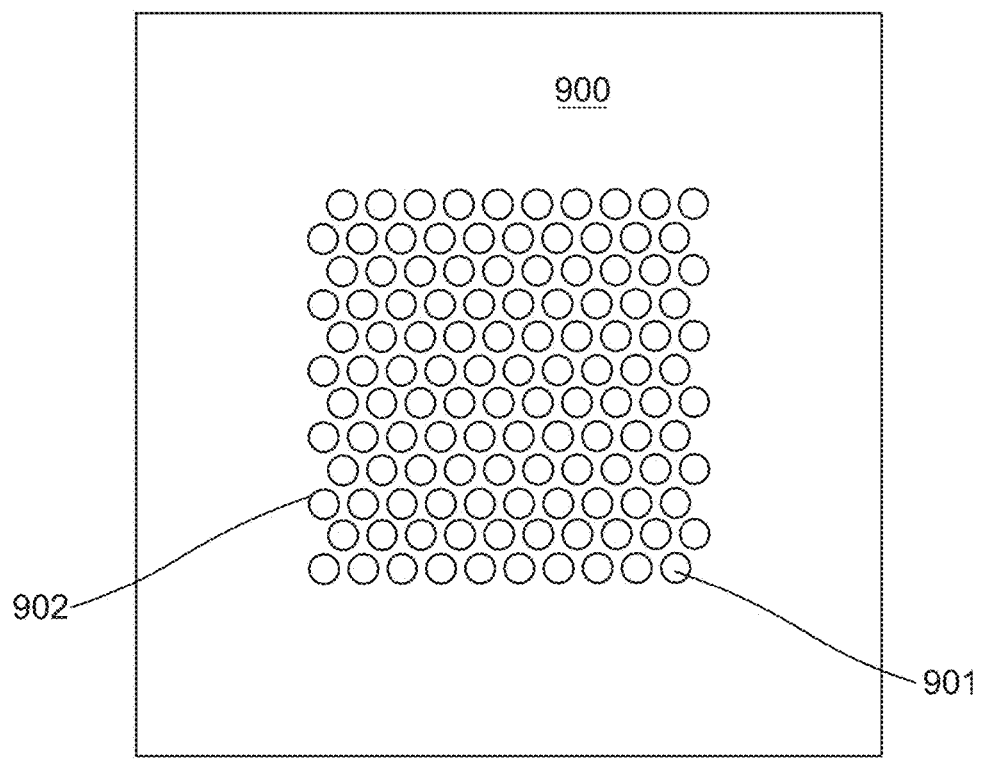
Figure 10:
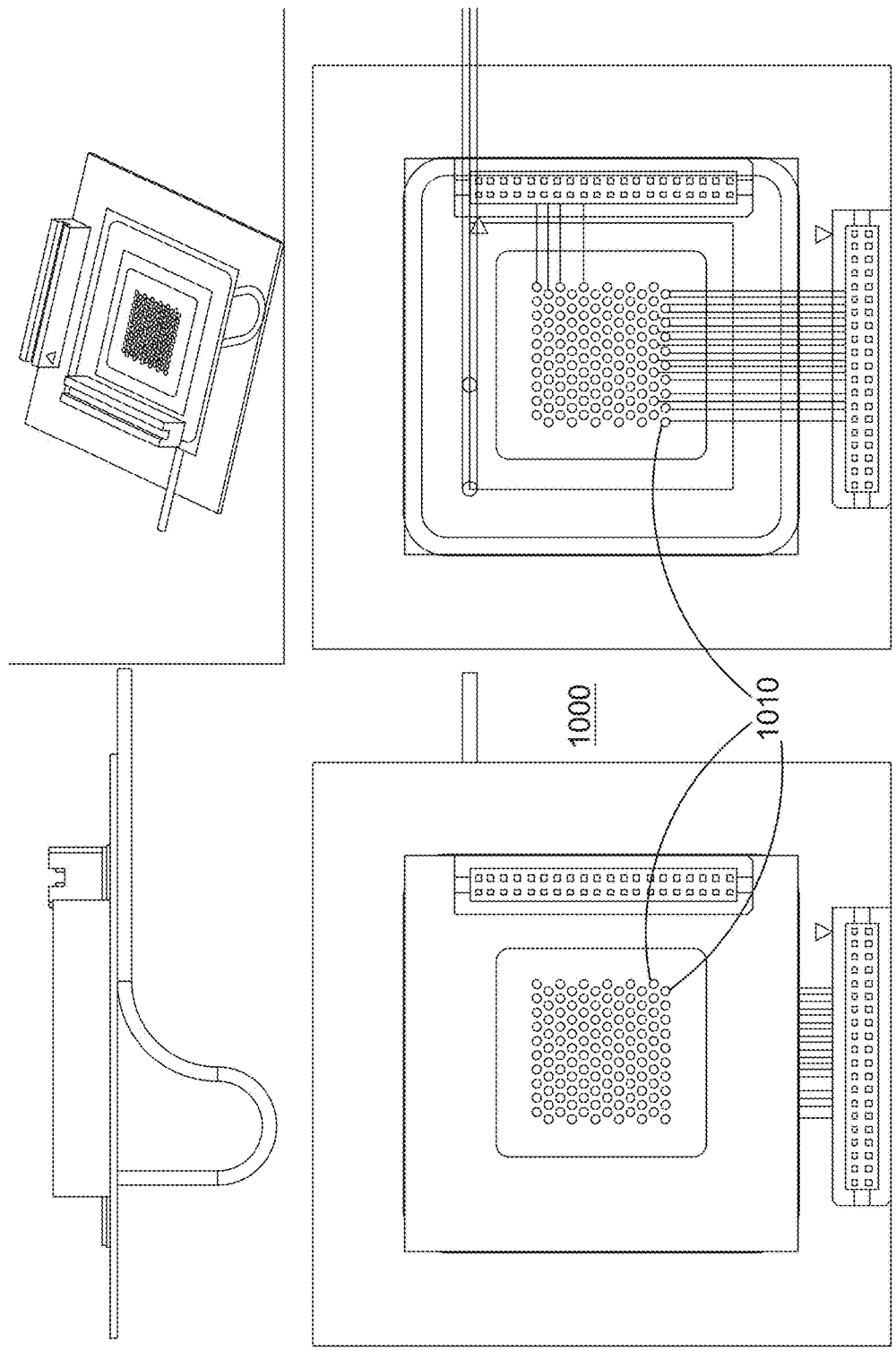
FIG. 10 is a two-dimensional perspective drawing of a grid-support PPS structure in accordance with embodiments of the invention.

In the embodiment of FIG. 8, the ultra-thin front substrate 802 constitutes the cover plate and can be fabricated from either an ultra-thin metal foil (e.g., aluminum or titanium foil), or an ultra-thin metalized insulator substrate. In the latter case the metalized ultra-thin insulator substrate could be made of: (1) a polymer film (e.g. Mylar, PEN, PEEK, etc.), or (2) an ultra-thin transparent inorganic substrate such as glass, fused silica, sapphire, etc., or (3) an ultra-thin ceramic such as $Si_3N_4$ or alumina, etc. The electrode configuration on the back substrate 814 is defined by a local electrode arrangement forming a capacitive discharge gap 820 coupled to an embedded resistor 830 in the high voltage feed lines. The resistance reduces the electric field during discharge and terminates the pulse. The effectiveness of this resistance in terminating the discharge has been experimentally demonstrated. Some features of the design concept are as follows: (1) Pixels can be defined in either an open structure as shown in FIG. 8, or an "open" cavity or grid-hole structure as shown in FIGS. 9 and 10, which is optically, physically and electrically isolated with the pixels established at the crossing points of electrodes as shown in FIG. 10; (2) Pixels can be close packed assuring high coverage (i.e., high fill-factor); (3) The gas envelope can be formed by ultra-thin, low mass, substrate materials such as glass, ceramic, metal foil, or even inorganic coated plastics; (4) Cavity geometry can be optimized for efficiency and discharge voltage; (5) Fabrication utilizes well established processes many of which are used in the production of flat panel displays; (6) A hard, sputter resistant surface that is very resistant to ion damage would likely be chosen for the cathode, such as a high temperature, corrosion resistant, refractory type metal coating (e.g. Ni, Cr, Ti, Zr, Pt, Mo, W, Ir, Ti—W, etc.), but could also incorporate a conductive or even semiconductive non-metal with similar physical properties such as $B_4C$, TiN, etc.

FIG. 9 illustrates a fabricated alumina grid-support plate 900 in accordance with one embodiment. Plate 900 is a 25.4×25.4×0.38 mm fabricated alumina grid-support plate with 120 laser cut, 1 mm diameter holes (e.g., 901, 902) located within a 13×13 mm active area, yielding a fill factor ~60%. The grid-support plate hole pattern for vacuum environments will sandwich/support the ultra-thin, ultra-low-mass window from both sides, whereas for operation under ambient pressure the grid-support hole plate supports the window from the inside since the gas pressure will be negative with respect to the outside ambient pressure. Window thicknesses can be as thin as 1 µm for Si3N4 or 1.5 µm for a double-sided metalized film of polyethylene naphthalate (PEN).

FIG. 10 is a two-dimensional perspective drawing of a grid-support PPS structure 1000 in accordance with embodiments of the invention. Structure 1000 has a 56×56 mm back plate and 38×38 mm front plate. The active cell area is 13×13 mm, and shown with 120 grid support plate cell holes (each 1 mm diameter), having the same pattern as in FIG. 9. Pixels in FIGS. 9 and 10 (e.g., pixels 1010 of FIG. 10) are close packed assuring high coverage (i.e., high fill-factor).

PPS device manufacturing employs a number of similar processes used for the production of LCD and PDP flat panel displays. The primary structural components include inorganic substrates (e.g., glass), dielectric printed window frame type structures and/or barriers, electrode depositions, gas filling and envelope sealing. Large panel 21-inch diagonal AC-PDP's with a cell pitch of 109 μm were fabricated in the early-1990s for high resolution applications. The structure of these AC-PDP's was in many ways more complex than the described PPS devices, as the former display panels involved difficult-to-control, thick-film screen printing of sequential RGB phosphor patterns requiring critical pixel alignment on "thermally unstable", high expansion, soda-lime silicate window glass substrates, as opposed to today's highly engineered, much more stable, display glass substrates. The PPS devices in accordance with embodiments do not require such difficult-to-control patterning processes on "thermally unstable" substrates. Additionally, these devices are based on "bare" electrodes as anode and cathode. This allows diminutive line widths and pitches. In fact the smaller line features on a typical smart phone display has ≤1.5 μm electrodes with ≤0.3 μm alignment accuracy. The line width uniformity can be achieved for example by conventional thin-film photolithography patterning including ion-milling etch processes, similar processes can be used for 100 μm pitch PPS electrodes. The cavities themselves can be fabricated by a variety of methods well known to those in the field, including chemical etching, thick-film patterning and laser drilling.

Figure 11:
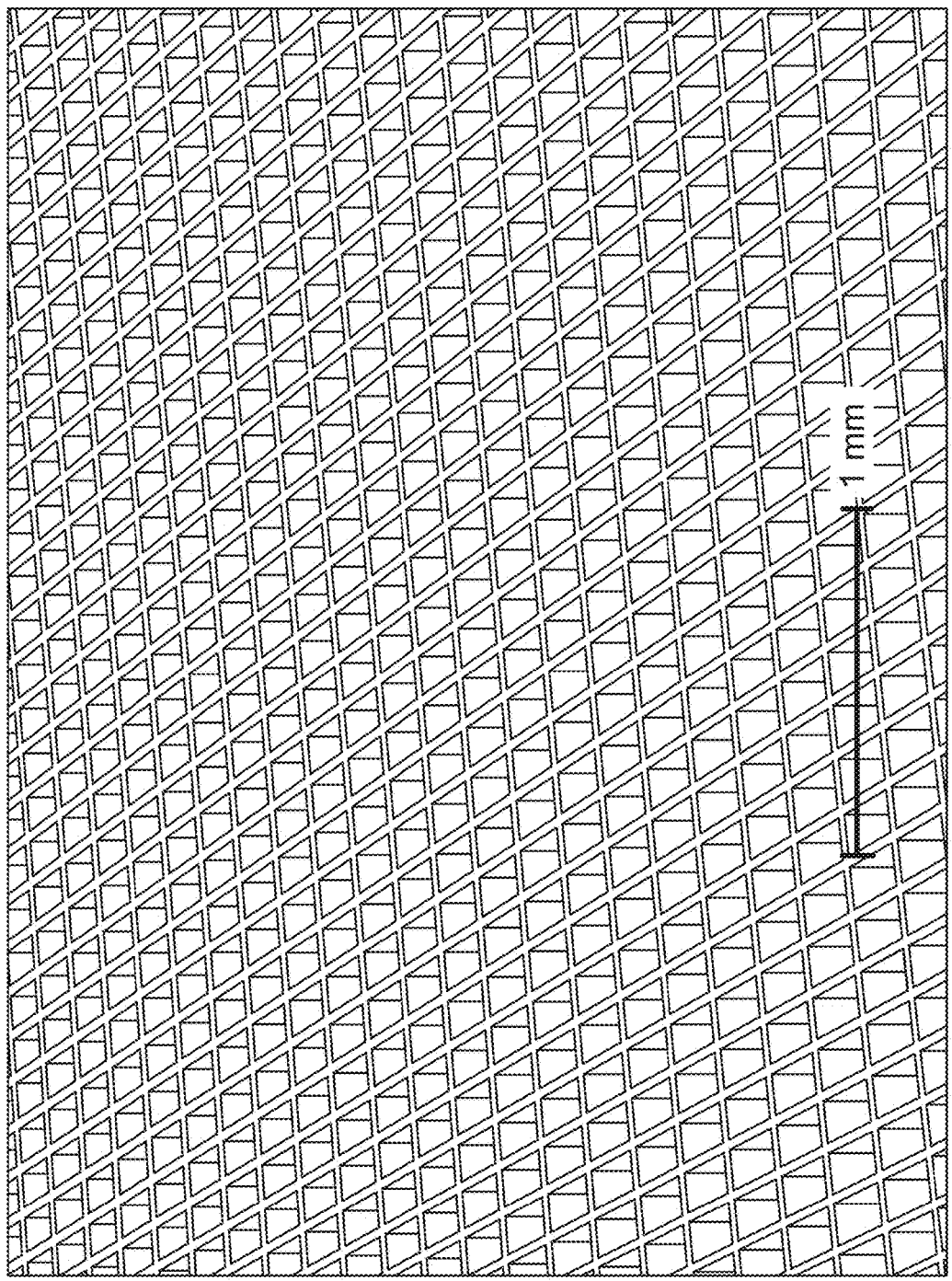
FIG. 11 illustrates an example of a grid-support array formed with thick-film patterning in accordance with one embodiment.

FIG. 9 illustrates an example of laser drilling. FIG. 11 illustrates an example of a grid-support cavity array 1100 formed with thick-film patterning in accordance with one embodiment. Cavity array 1100 is produced by a UV-assisted roll forming process used in PDP fabrication. Rib walls as narrow as 20 μm have been fabricated using this process.

For many applications, cavity structures are not needed at all, and in fact could be counter-productive by reducing the device efficiency, as the thickness of the cavity walls creates dead space that reduces the device fill-factor. In such "open" configurations, narrow dielectric strips or thin window frame type structures could be deposited or printed over at least one of the discharge electrodes to prevent or at least minimize discharge spreading. Alternatively, dielectric walls could be fabricated between discharge electrodes and could even be combined with the above dielectric strips or windows frame patterns to form a more defined discharge cell/pixel structure. Depending upon the application, these dielectric strip, window, or wall structures need not bridge the gas gap, and therefore need not serve the dual function as substrate spacers. If dielectric walls are used, they could even have varying heights with some sections being open and other sections acting as pedestals or substrate gas gap spacers. Many variations of such dielectric structures can be made and in fact are commonly used today in commercial DC-PDPs for the same purpose of confining or localizing the gas discharge. Such devices might be able achieve geometric fill factors that could approach 100%, and when combined with ultra-thin substrates, could potentially result in ultra-thin, ultra-low-mass, particle detectors having detection efficiencies on the order of 95% or possibly higher. In particular, by constructing "open cell" structures with large gas gaps and operating at sufficiently high fields, device efficiencies approaching 100% should be attainable.

The materials requirements for embodiments of the invention are determined primarily by radiation hardness and aging resistance. Materials intended for use are intrinsically non-degrading with exposure to UV/VUV photons, ionizing radiation, and ion bombardment at the cathode surface. The described PPS devices, like PDPs, incorporate inert, non-reactive and sputter resistant components. Examples of the three most critical materials follow.

Substrate: The substrate is ideally comprised of ultra-thin, very low gas permeability, flat panel display glass, although ceramic substrates such as alumina or engineering glass-ceramic or ceramic type materials are also suitable. An example is Corning Eagle-XG Slim™ Display Glass, commercially available in meter sizes and larger and in thicknesses of 0.3 mm and thinner. Other glasses by Corning such as flexible "Willow" glass are commercially available as rolls in thicknesses of 0.1 mm and 0.2 mm roll, and Schott is making ultra-thin glass in thicknesses of 0.025 mm. Other substrate materials include 0.001 mm thick $Si_3N_4$, 0.125 mm fused silica and alumina, metal foils and polymer films on the order of 0.01 mm. For gas permeable substrates such as polymer films, etc., the ultra-thin PPS would itself have to be enclosed in a polymer film or metal foil based single or multi-walled window chamber/enclosure filled with the same gas as shown in FIGS. 4-6, at the same gas pressure as the PPS.

Metal Electrodes: Metal electrodes are subject to continuous ion bombardment and should be composed of sputter resistant, refractory type materials. One indicator of the strength of the metallic bond to resist ion sputtering is the melting and boiling point temperature. Promising choices for an electrode material includes: Ni, Cr, Ti, Pt, Ru, Zr, Ir, Mo, W, Ti—W, etc.

Gas Fill: PDPs are hermetically-sealed with demonstrated remarkably long lifetimes. Units sold in the 1970's and operating continuously (24/7) are still functioning today, more than 35 years later. This leads to a design objective of PPS detectors: the gas remains sealed inside the envelope without the need for an external gas system, although this may not be desirable for ultra-thin PPS devices in which the panel envelope is effectively extended outward by being "packaged" within an external enclosure/chamber with at least one ultra-thin wall/window. The PPS discharge gas should ideally be a stable or inert host gas either by itself or with one or more added components such as a quench gas. The choice of gas mixture may also be dictated in part by the need to minimize internal sources of free-electrons that might collect on the wall surfaces. In some embodiments a method demonstrated to inhibit unwanted free-electrons can be employed to minimize the number of gas-phase metastables, reducing lifetimes of gaseous excited state species. This involves the addition of a suitable Penning gas dopant with good electron affinity, a large electron capture cross-section, and VUV absorption. Dopants could include: Xe, $CO_2$, $N_2$, $CF_4$, $SF_6$, etc. Hydrocarbons such as $C_2H_6$, $C_3H_8$, i-$C_4H_{10}$, etc. are generally unsuitable as their decomposition would be problematic for those embodiments that have a hermetically sealed structure. Finally, for PPS configurations in which it is desirable to minimize the gas gap, which could include certain ultra-low-mass PPS structures with minimal internal dielectric structures, gases having large radiation interaction cross-sections would be favored such as Xe, $CF_4$ and $SF_6$.

PPS devices that incorporate gas flow-through systems should be practical for a number of ultra-thin detector applications including active-pixel ion beam monitors, low energy charged-particle detectors, low scattering hadron particle medical imaging systems such as proton CT imagers, detectors and dosimeters for X-ray and proton therapy, etc. Because of potential gas permeation issues in the thinnest configurations of some embodiments of ultra-thin PPS detectors, for example devices made with substrates in the range of approximately 1-20 microns, such devices might require continuous or periodic gas exchange in a flow-through detector design. In some such embodiments the ultra-thin PPS could be configured with an "optional" second exhaust valve. FIGS. 12A-C illustrate an ultra-thin PPS with a second exhaust valve in accordance with one embodiment and a surface-discharge electrode structure in accordance with another embodiment. FIG. 12C is for a surface-discharge electrode configuration in which pixels 1250 are formed from segmented cathodes 1260 coming from a cathode bus-bar 1270 on the bottom surface up to top surface of the back substrate through a conductive via (not shown), and paired in close proximity to anode lines 1280 on the top surface of the back substrate.

Many electrode configurations are possible, some based on columnar-discharge structures, others based on surface-discharge and/or microcavity-discharge electrode structures. In the example shown in FIG. 12B, the electrode structure 1204 would be based on line anodes and cathode segments with "optional" quench resistors in each cell. Such structures would share a number of similarities with various microcavity-PPS or cavity grid-support PPS back plate resistor/bus-bar configurations. The cavity grid-support structure could be fabricated, for example, as an intermediate rectangular cavity/spacer plate with the thin-film anode traces running under the cavity spacer plate and through the perimeter seal. The intermediate cavity plate could have a seal groove on both the top and bottom surfaces to accommodate the seal material without spacers and thereby sealing the back and front plates flush to the cavity grid-support structure. FIG. 12B shows the orthogonal "vertical" cathode bus-bar layout 1204 on the bottom surface of the bottom substrate, with the "horizontal" anode line structure shown on the top surface of the bottom plate. A similar cavity series resistor layout used for microcavity-PPS devices can be used here for the surface-discharge ("SD") structure shown in FIG. 12C. The described structures would employ conductive cover plates that could be either an ultra-thin metal foil or metalized polymer film or metalized ultra-thin ceramic, all of which would be in a thickness range of ~1-20 microns.

As disclosed above, ultra-thin PPS detectors can be fabricated where the electrodes 1204 shown in FIG. 12B are configured for a columnar-discharge arrangement. In such an arrangement one set of electrodes would be on the top substrate and one set on the bottom substrate. For example, the "vertical" electrodes could now be the cathodes and located on the top surface of the bottom substrate with a quenching resistor at the end of each cathode line positioned outside of the seal located to the right in FIG. 12B. Conversely, the "horizontal" electrodes would now be the anodes located on the bottom surface of the top substrate. Unlike the drawing for the surface-discharge description in FIG. 12, the top substrate would now have to extend beyond the bottom substrate to gain access for electrical connection to the anode. The actual columnar-discharge electrode layout is best illustrated in FIG. 1.

The use of ultra-thin PPS devices in accordance to embodiments for neutron detection is of significant benefit for additional reasons than previously disclosed. For neutrons, the thickness of the substrate materials of the common display panel glasses, ceramics (e.g., alumina), metals foils (e.g., Al and Ti) and polymers has very little effect, if any, on neutron attenuation or scattering. However the substrate thickness has a large effect on gamma attenuation/interaction including scattering, and therefore on the neutron-to-gamma discrimination ratio which is critical for most neutron detector applications.

In one embodiment, the PPS device embodiments disclosed herein can be made into neutron detectors by either of two means. The first method involves simply filling the PPS detector with a gas mixture that contains a significant amount of $^3$He or $^{10}$BF$_3$ as the active neutron detecting media. Thus even for basic DC-PDP commercial panels that have been modified to function as charged particle detectors, such as that shown in FIG. 3, by filling these devices with a $^3$He or $^{10}$BF$_3$ gas mixture they can become a good neutron detector. The second method is to deposit a thin-film layer of an efficient neutron absorber, such as $^{10}$B or $^{155,157}$Gd (or even an appropriate $^6$Li compound), on selected inside surfaces of the PPS and then operate the device as a conventional particle detector. In this manner, the emitted charged particles from $^{10}$B (e.g., alphas and Li ions), or $^{155}$Gd and $^{157}$Gd (e.g., conversion electrons) will initiate the gas discharge in the normal fashion and be detected with a standard discharge gas mixture (e.g,. $CO_2$ in Ar, etc.). The above neutron absorbing $^{10}$B or $^{155,157}$Gd could even be coated on top of either the anodes, or cathodes, or both, or even adjacent to the anodes or cathodes, or along the sidewalls of the grid-support or cavity structure. Because only thin layers of such neutron absorbers can be coated per PPS device, to realize high overall neutron detection efficiency such PPS neutron detectors would need to be vertically stacked in a multilayer configuration or have a very high aspect ratio of cavity hole-height to hole-diameter.

Figure 14:
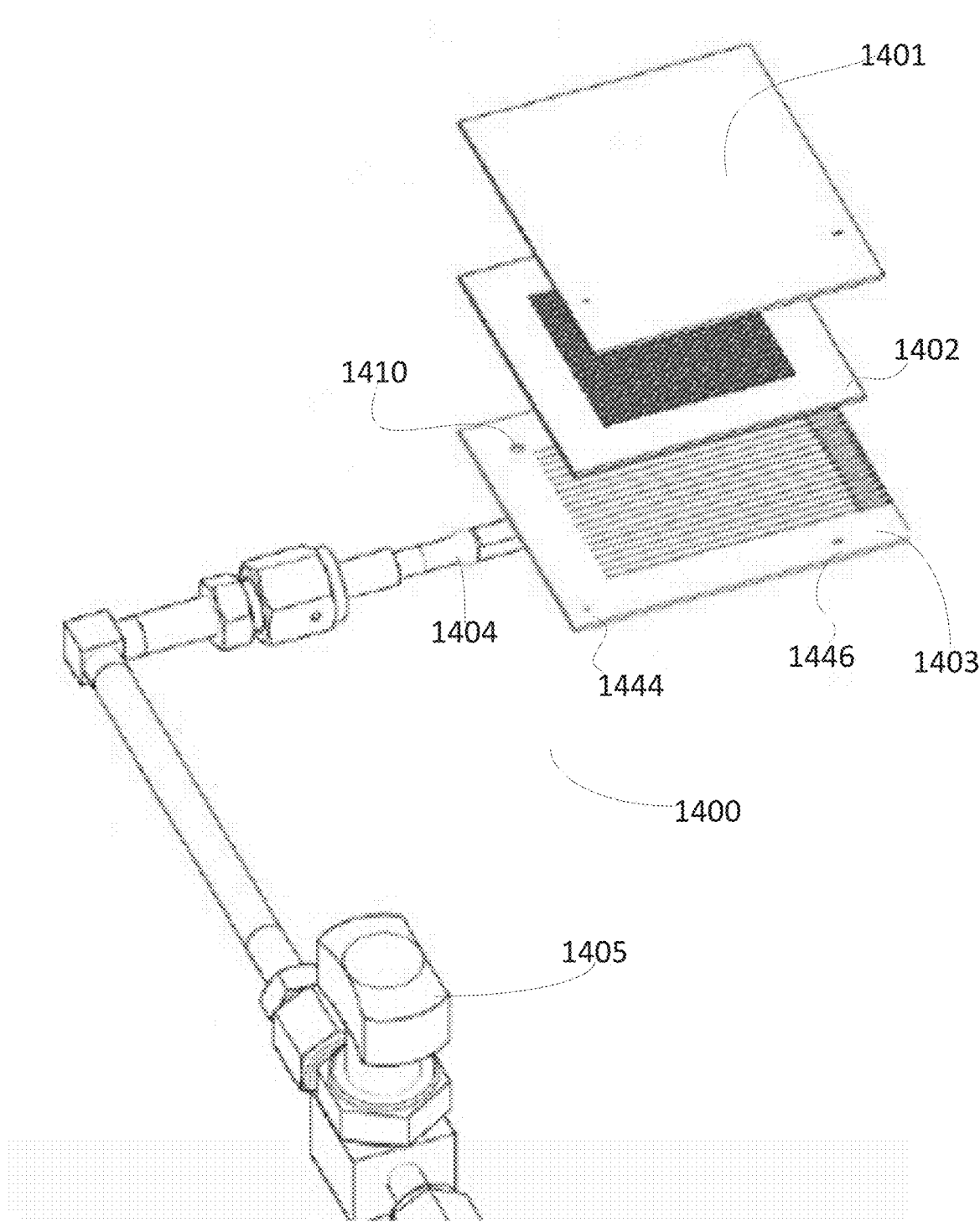
FIG. 14 is a perspective view of a grid-support PPS structure in accordance with one embodiment.
Figure 15:
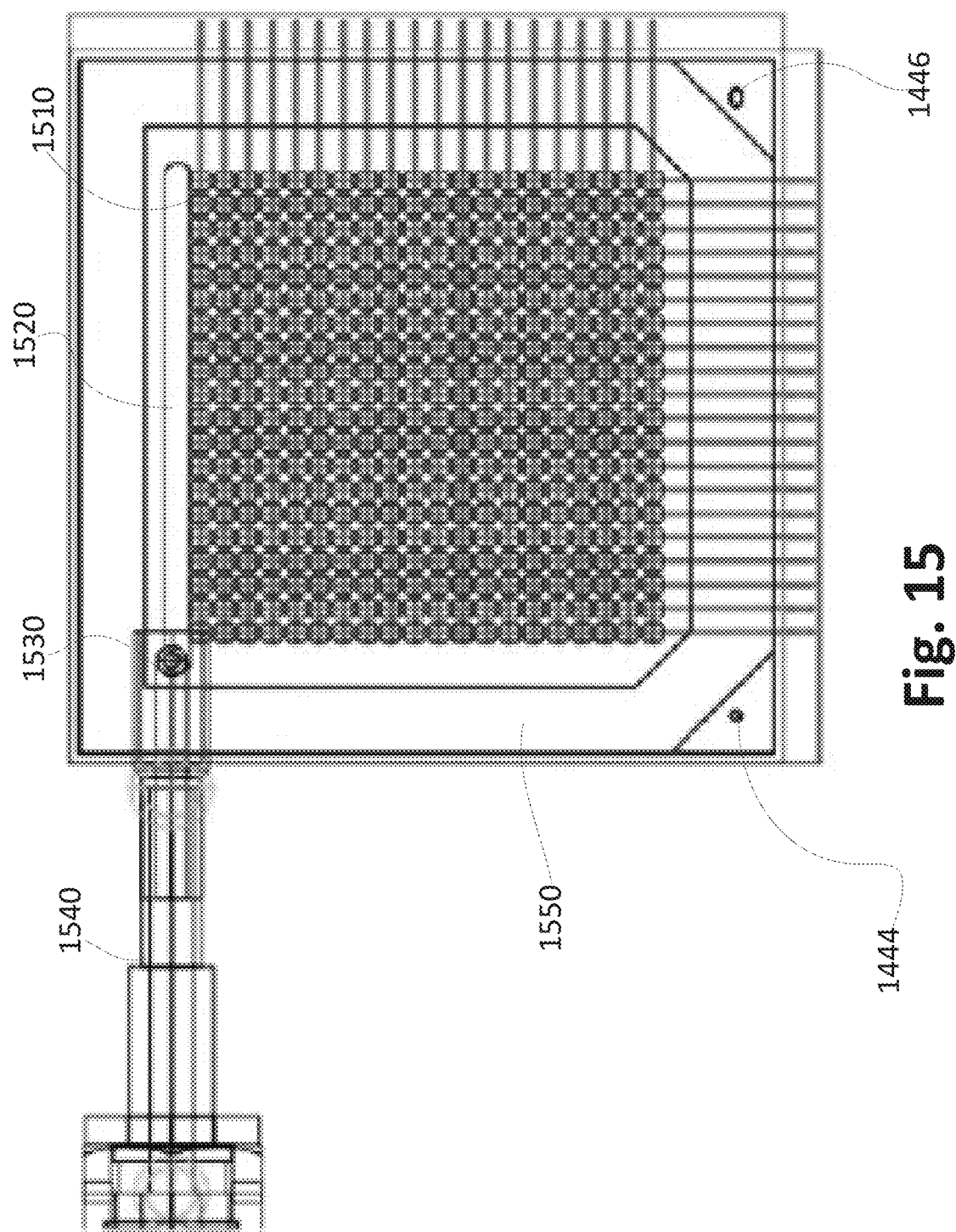
FIG. 15 is a top view of a more detailed composite overlay view of the three plate PPS structure of FIG. 14 in accordance with one embodiment.

FIG. 10, and FIGS. 12, 14 and 15 illustrate the design of two different grid-support PPS structures. FIG. 12 illustrates a surface-discharge PPS grid-support structure, while FIGS. 14 and 15 illustrate a columnar-discharge PPS grid-support structure that would incorporate a series resistor on each cathode line as in FIG. 2, while FIG. 10 illustrates a grid-support structure which could incorporate a quench resistor either in each cell, or on each cathode line outside the seal area. A grid-support cell hole test plate with the same 13×13 mm active area as shown in FIG. 10 is shown in FIG. 9 (the holes were laser drilled). It is noted that the active area cell fill-factor in FIGS. 9 and 10 is ~60%.

Figure 13:
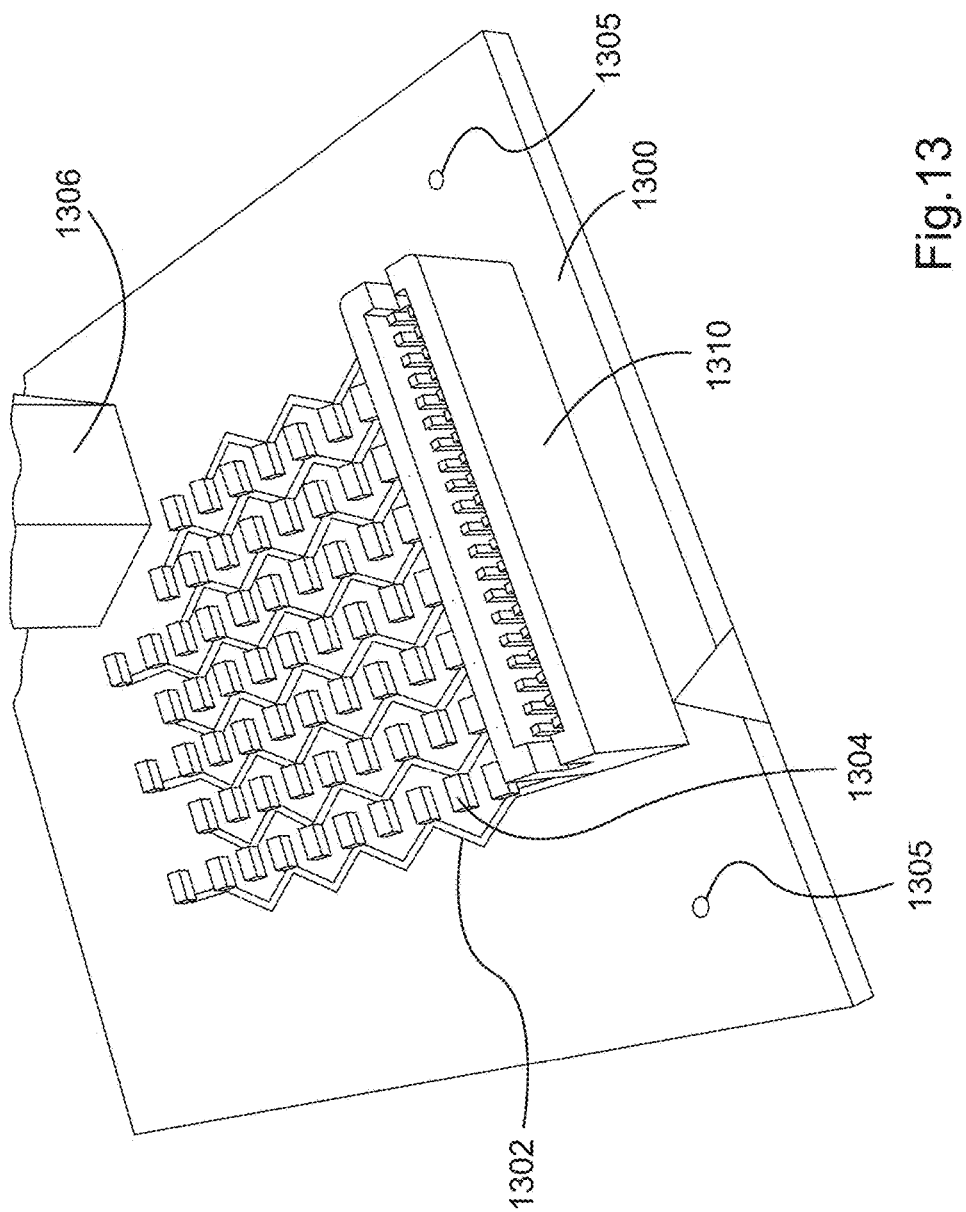
FIG. 13 illustrates the bottom substrate of a PPS structure that incorporates a cathode cell quench resistor located on the back side of the bottom substrate, with one resistor for each cell, in accordance with one embodiment.

FIG. 13 illustrates the bottom substrate 1300 of a PPS structure that incorporates a cathode cell quench resistor located on the back side of the bottom substrate, with one resistor for each cell, in accordance with one embodiment. The electrode structure on the backside in FIG. 13 would connect to a cathode on the topside of the back substrate by means of a laser or mechanically drilled conductive via. A higher cell resolution version having a higher fill-factor could be achieved by replacing each thick-film conductive via with a thick-film resistive via connecting directly to the backside cathode bus-bars, thereby eliminating the surface-mounted-technology ("SMT") resistors shown in FIG. 13.

The backside of substrate 1300 is a 4 mm cell pitch, 56×56 mm grid-support PPS back plate showing discrete SMT resistors 1304 soldered to their pads connected to each circular cell HV-cathode on the topside by a conductive via going from the backside to front side. FIG. 13 also shows zig-zag cathode bus-bars 1302 that terminate at the edge cable connector 1310. A vacuum stainless steel hex-fitting (to the gas-exhaust/gas-fill line) 1306 is shown in the top right corner. Alignment holes 1305 are shown next to connector 1310.

For some of the above disclosed embodiments, a series cell quench resistor can bridge the high voltage bus on the backside to a "circular" cathode on the topside centered inside the circular grid-support plate structure shown in FIGS. 9 and 10, thus establishing independent readout sites along one coordinate. The sense/anode lines on the inside surface of the ultra-thin window provide an orthogonal coordinate readout. This grid-support structure can be made using standard PDP thick-film cavity fabrication technology directly onto the back substrate after the thin-film electrodes and vias have been fabricated, or laser drilling on a grid-support plate, or by mechanical milling or other means such as by photolithography and chemical etching, etc.

FIG. 14 is a perspective view of a grid-support PPS structure 1400 in accordance with one embodiment. Structure 1400 includes a top plate 1401, an intermediate grid-support plate 1402, and a bottom plate 1403, along with gas fill tubing 1404 hermetically sealed to a panel gas-fill hole 1410 and connected to a gas fill/shut-off valve 1405. In the embodiment of FIG. 14, which has a columnar-discharge type PPS electrode structure, the 20 vertical column electrodes on the bottom surface of the top substrate are not shown (although they are shown in FIG. 15), but the 20 orthogonal horizontal row electrodes on the top surface of the bottom substrate are shown. Proper alignment of the three plates 1401-1403 is achieved using an external alignment fixture with alignment pins that fit through the respective alignment holes 1444 and alignment slots 1446. Of course other alignment schemes can also be employed such as a variety of alignment fiducials and/or edge grooves or other markings, etc.

FIG. 15 is a top view of a more detailed composite overlay view of the three plate PPS structure of FIG. 14 in accordance with one embodiment. FIG. 15 illustrates the orthogonal 20 column top substrate and 20 row bottom substrate electrodes, forming 400 pixels, shown along with their respective electrode pad connector pattern located for the top plate on the bottom edge, and for the bottom plate on the right edge. FIG. 15 also illustrates a major horizontal gas flow channel artery 1520 that connects each of the 400 shown individual cavity holes that define each pixel 1510, via a matrix of connecting gas flow notches between adjacent cavities (not shown), to the gas fill hole 1530 located near the top left corner which is sealed to the gas-fill tubing and tube connection hardware 1540 to the gas-fill/gas shut-off valve 1405 shown in FIG. 14. A double-sided hermetic seal 1550 is also shown in FIG. 15 between both the top surface of the bottom plate and the bottom surface of the middle grid-support plate, as well as between the top surface of the middle grid-support plate and the bottom surface of the top plate. In addition, at the two bottom corners of the panel in FIGS. 14 and 15 can be seen a pin alignment hole on the bottom left 1444 and a pin alignment slot on the bottom right 1446. In the embodiment of FIG. 15, the seal channel 1550 to the bottom edge makes a 45 degree angle so as to keep the seal away from the external plate alignment holes in order that the holes not provide a leak path into the sealed panel gas volume.

The closed cell, grid-support PPS device embodiments disclosed above have at least three particularly important advantages in contrast to known devices: (1) they can structurally support an ultra-thin window that will transmit very low energy, ion beam nuclei with both high position and high temporal resolution, (2) the closed cell structure physically isolates each cell from its neighbors thereby eliminating cell crosstalk due to migrating metastable excited species and VUV photons from causing secondary discharges in neighboring cells, and (3) the grid-support structures act like a matrix of tubular spacers surrounding each cell like a honeycomb structure and result in an extremely uniform gas/discharge gap which directly translates into a uniform field with uniform discharge characteristics including both temporal response and pulse arrival time distributions. Since the grid-support substrate surfaces can be easily machined or lapped flat and parallel to within about ±3 µm or better if polished, this would represent a gas discharge gap non-uniformity of just 0.3% for a 1 mm height grid. As shown in FIG. 13, surface mount resistors 1304 can bridge each inside cell cathode to an external high voltage bus 1302. The grid-support plate 1402 in FIG. 14 can be laser or mechanically machined or photo-chemically etched from previously described glass or ceramic or glass-ceramic substrates. Assembled devices can be either hermetically-sealed, as shown by the perimeter seal 105 in FIG. 1, or sealed with a gas-flow system as shown in FIGS. 4-6 and 12. The anodes in FIG. 10 or 12C or 14 are at ground potential, and connect to X-coordinate readout electrodes. Capacitive coupling to the HV lines, or direct readout, can deliver the Y-coordinate signal. X-Y ambiguities can be resolved with fast signal time stamps. For very large area windows/devices, fabricated using either double-sided metalized films on a polymer substrates, or ultra-thin metal foils, the grid-support structure can be inexpensively fabricated via thick-film technology such as shown in FIG. 11. These and related precision processes are commonly used in the fabrication of PDP barrier rib structures.

Plasma discharges can initiate other discharges to regions beyond the cell. The precursor avalanche produces UV photons that can propagate to other regions where photo-electric ejection or even direct ionization of the gas can occur. Excited metastable species can also propagate and cause discharge spreading. Both of these mechanisms can be eliminated by a matrix of barrier or grid-support walls surrounding each cell to prevent propagation of VUV photons and metastables. Virtually all PDP televisions have internal barrier structures, with the fabrication processes for these structures well-established (e.g., as shown in FIG. 11). Alternatively, a proper choice of gas quenching and/or VUV absorbing agent and electrode materials can be effective. Penning gas mixtures are a tried and true method to depopulate metastables by collisional energy transfer resulting in ionization of the lower energy state component. In addition, polyatomic molecules by their very nature (i.e., being multi-atom), can potentially be effective agents for non-radiative energy transfer and internal conversion, and can also be good VUV absorbers. As disclosed above, even with open-structured PPS devices (i.e. no internal barriers, as shown in FIGS. 2 and 3), discharge spreading to adjacent cells can be minimal with proper selection of the discharge gas and quenching resistor. With regard to the cell circuitry, the use of a properly sized series resistor can quickly drop the cell or line voltage, thereby collapsing the field and truncating the discharge. A combination of the above factors has proven to be effective in addressing and managing the problem of discharge spreading. This problem should be essentially eliminated by enclosing each discharge site in an optically and electrically isolated cavity (e.g., the grid-support PPS structure).

Figure 16:
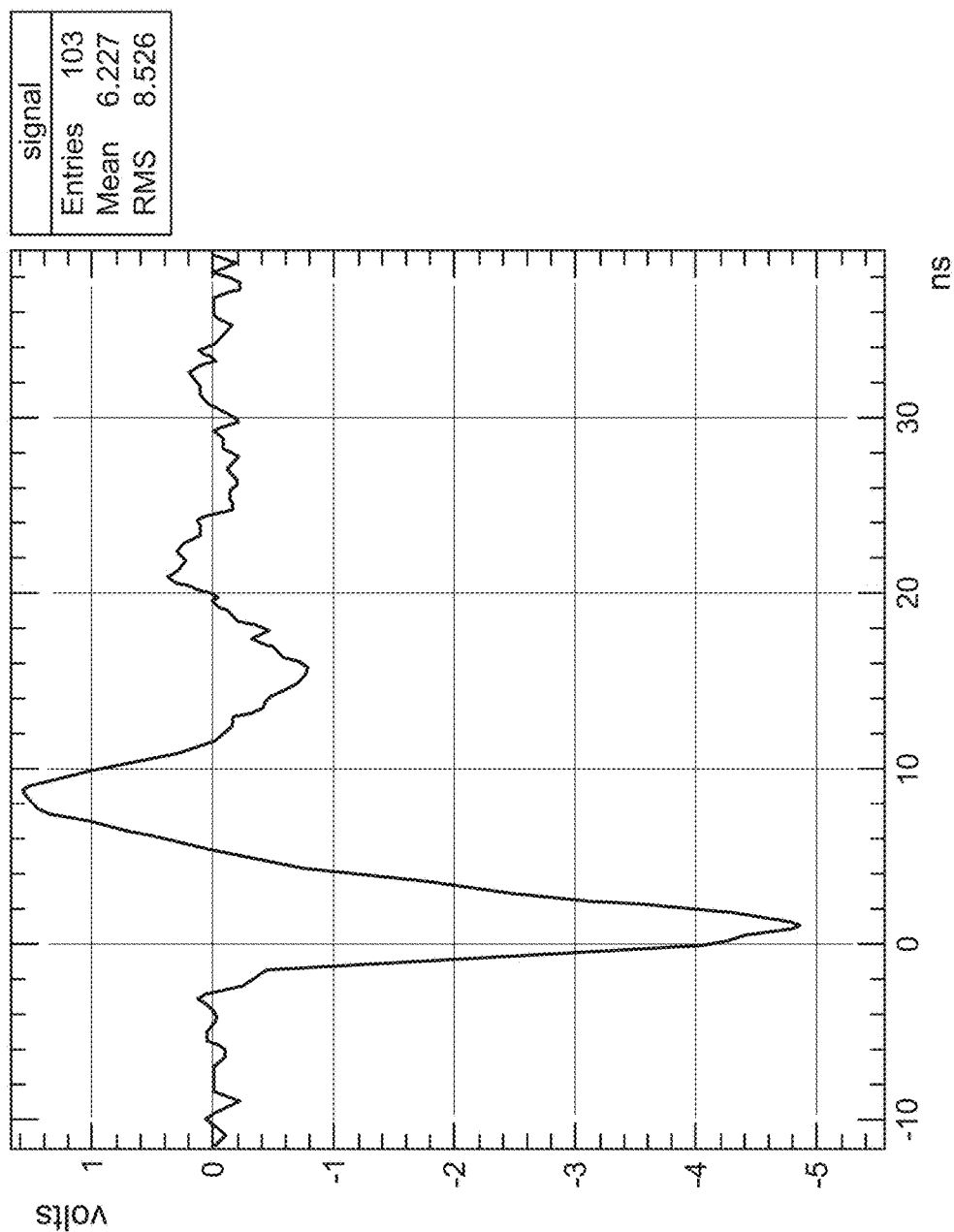
FIG. 16 is a graphical illustration of volts vs. time in nanoseconds illustrating a characteristic PPS signal induced by a beta source in accordance with embodiments of the invention.

Using modified-PDPs, six different gas systems have been studied, namely: $Ar+CO_2$, $Ar+CF_4$, $He+CF_4$, $CF_4$, $SF_6$, and Xe. Not unexpectedly, large variations in device response and performance are observed for the various gases and pressures. The device performance has been shown to be very much gas dependent, with the breakdown voltages varying by more than 1000 volts for different gas mixtures in the same panel. It is clear that different applications will require different gas mixtures. The gas pressures studied to date range from 200 to 730 Torr. FIG. 16 is a graphical illustration of volts vs. time in nanoseconds illustrating a characteristic PPS signal induced by a beta source in accordance with embodiments of the invention. The signal of FIG. 16 is observed on a commercial PDP filled with 600 Torr Xe (in 2003). Note the large amplitude volts level signal and nanosecond level rise time (measured in 2010). In general, as shown in FIG. 16, the signals observed from all of the gases tested have large amplitudes of at least several volts, so there generally is no need for amplification electronics and in most cases the signals have had to be substantially attenuated. For each gas the shape of the induced signals are substantially uniform, and inherently digital. The rise time is typically 1-2 ns, the FWHB varies, but for some gases has been measured as 2 ns.

The discharge spreading to neighboring cells is very much gas dependent, but even in an "open" cell structure the discharge spreading can be minimized even though these devices operate in the Geiger mode, producing large amplitude, high gain discharges. Significantly, this has been done without an internal barrier structure around each cell, and the devices do not require the addition of a hydrocarbon quenching gas component that would certainly degrade in a plasma discharge environment.

For grid-support PPS devices in accordance with embodiments, faster response times are anticipated (i.e., in the sub-nanosecond range) with smaller cell dimensions, better cell physical and electrical isolation, and lower panel capacitance. The grid-support wall structure, as shown for example in FIGS. 9, 10, 14 and 15, in physically isolating each cell effectively prevents both gaseous metastable species (i.e., long-lived excited state atoms) and VUV-UV photons created in the discharge from spreading to adjacent cells, thereby further reducing cell crosstalk and enhancing the temporal resolution. As disclosed above, huge performance variations are associated with different gas mixture compositions and pressures. The fast response times observed to date are assumed to be largely due to the very high gain of the PPS Geiger-mode electron avalanche, which is likely generated via a "micro-streamer" gas discharge type mechanism. The grid-support PPS structure, with very thin walls between adjacent cavities, offers the potential for greatly increased efficiencies and much better temporal resolution (in addition to the obvious enhanced position resolution). This is because the grid-support structure can offer a much higher proportion of active gas volume between the cathode and the sense anode. Achieving spatial fill-factors of 80% to 90% can be achieved using standard fabrication processes known to those skilled in the art. For example, since the cavity/holes can be fabricated by a variety of processes, including laser, photolithographic, and mechanical/ultrasonic patterning, as well as numerous variations of thick-film technologies, as shown for example in FIG. 11, grid-support/cavity structures of almost any shape or dimension can be made down to ~50 µm or less (e.g., hexagons, inverted triangles, diamond shapes, modified ellipsoids, etc.).

Further, advantages are achieved based on the uniformity of the gas gap. For example, in constructing a grid-support cell structure by the subtractive method of removing the hole material, a thin wall of remaining dielectric material of uniform height is left around each grid-support cell. More specifically, the grid-support structure should result in almost perfect uniformity with respect to the discharge gap (e.g., about ±0.3%, as compared to at least a 20% variation in gas gap across some of the modified-PDPs as in FIG. 3. This huge improvement in gas gap uniformity is because the grid-support PPS gas gap will now be defined by the height uniformity of the grid-support walls, which in turn depends on the substrate thickness uniformity which can be lapped flat and parallel to within standard tolerances of 2-3 µm, or better if needed—e.g. critical optical parts can be fabricated to hold a thickness variation over a 6" diagonal of within 0.003 µm. A 3 µm height variation in a 1 mm height cavity represents a gas gap variation of 0.3%. Yet even with the non-uniformity observed in the modified-PDPs, such as shown in FIG. 3, a position resolution of 0.7 mm was able to be demonstrated in a panel with a 1.0 mm pixel pitch.

Further, beam diagnostic and tracking detectors are especially critical in heavy ion beam experiments. At the very least, experimenters need high efficiency, fast detectors to count beam particles incident on the target. For some experiments the beam position just before the target must be measured, as well as the time-of-flight of the beam particle. The requirements on beam counting and timing detectors include high efficiency and very fast rise time, preferably less than 1 ns, and very low dead time to allow counting beams available in the next generation of radioactive ion beam ("RIB") facilities. For tracking, position resolution of better than 1 mm is required, along with small relative energy loss in the detector so as to minimize the perturbation of the beam. In this regard, current PPS devices have already achieved position resolutions better than 1 mm.

Intensity profiles and emittance analyses are among the most critical tools for optimizing beam transport through accelerators. The PPS is highly position and intensity sensitive (i.e., intensity via number of cells firing repeatedly). Most beam experiments require minimum detector interaction, which means sufficiently thin detectors with low mass to permit maximum transmission of the beam with minimal energy loss. Device optimization therefore requires a careful balance between substrate material, gas composition, pressure, and gas path length. The higher the device efficiency, the less gas needed for suitable ion-pair generation and therefore a lower internal gas pressure thus allowing a thinner substrate with high beam transmittance in the accelerator vacuum environment.

The PPS in accordance with the disclosed embodiments further has the potential to serve as a rugged beam position and intensity monitor in certain applications where there are few useful solutions at present. In particular, operators of the current and next generation RIB facilities need monitors able to count from one particle per second up to a few tens of millions while delivering accurate beam position information. The simple design of the PPS, using amorphous materials and an inert gas interaction media is likely to withstand radiation damage more easily than semiconductor detectors. It should also have a longer life than solid-state electron multipliers (e.g., microchannel plates).

The particular requirements for different facilities will require variations in the thickness and size of the position sensitive detectors. At lower energy facilities, E<10 MeV/A, the beams are generally small and the diagnostics are 2 to 5 cm wide. For continuous monitoring at these facilities, the detectors must be extremely thin so as to minimally distort the divergence or energy of the beam. At higher energy facilities, E>20 MeV/A, the beams are often dispersed over a large area, requiring devices from 10 to 50 cm wide, as at the National Superconducting Cyclotron Laboratory ("NSCL"). Thickness is somewhat less of an issue for these facilities.

Embodiments include electronics similar to the detectors disclosed in U.S. Pat. No. 7,332,726, and U.S. Pat. Pub. No. 2010/0265078, which count each discharge pulse as an event, and then base an amount of detected radiation on the number of counted events. Electronics can also use time-stamp circuitry so that a single pulse is not counted as multiple events. Embodiments provide higher signal rates, faster timing, and more precise positional information than most other ionization sensing devices, but are expected to be similar with respect to triggering and readout possibilities. The speed of these devices reduces the probability of fake or ambiguous association of hits from the two orthogonal readouts.

Figure 17:
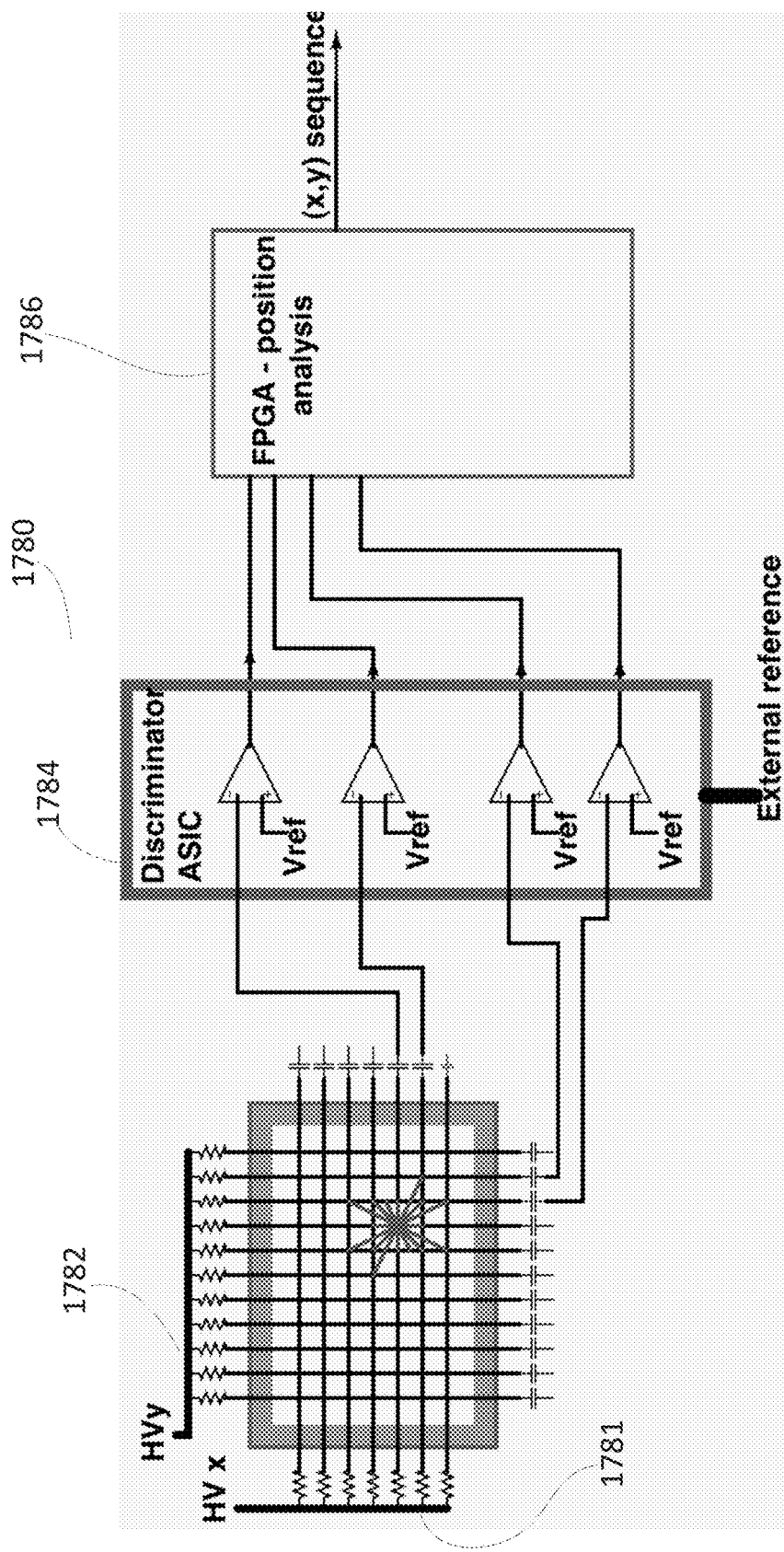
FIG. 17 is a block diagram of pulse-counting type electrode circuitry for detecting each gas discharge cell interaction and counting each such interaction as an individual pixel discharge event in accordance with one embodiment.

FIG. 17 is a block diagram of pulse-counting type electrode circuitry 1780 for detecting each gas discharge cell interaction and counting each such interaction as an individual pixel discharge event in accordance with one embodiment. Circuitry 1780 can be coupled to the PPS devices disclosed above. In FIG. 17, X- and Y-electrodes, 1781 and 1782, are shown as being in an orthogonal arrangement (i.e., rows and columns). However the X- and Y-electrodes are not restricted to orthogonal patterns and can be configured in any such way consistent with being able to count and record pixel discharge events. Further, the counting circuitry used with the PPS, disclosed in U.S. patent application Ser. No. 11/155,660, the disclosure of which is herein incorporated by reference, may also be used with embodiments of the present invention. The circuitry disclosed above can utilize any one of a number of current-limiting impedance component arrangements with regard to the two, gas-discharge electrodes (e.g., variously described as X and Y, or cathode and anode, or row and column), which are in-turn coupled to the event counting detection electronics shown in, for example, FIG. 17.

The various embodiments of the detectors of the present invention as disclosed herein, and as illustrated by the circuitry shown in FIG. 17, are fundamentally digital in nature and as such the detection electronics does not record the magnitude of a given cell discharge as does most "conventional" detectors operating in the linear region as proportional detectors, but instead operates in the non-linear region and can employ Geiger-Mueller type counting techniques/circuitry, thus assigning essentially the same value to each event regardless of the cell discharge magnitude. Embodiments of the present invention can use circuitry to acquire pixel discharge data by utilizing standard point scanning, line scanning, or area scanning techniques.

Circuit 1780 further includes a discriminator 1784 to produce logic pulses which can then be fed to an array of field-programmable gate array ("FPGA") logic arrays 1786. FPGA arrays 1786 can perform the calculation of the position for each hit, and emit a stream of time-stamped (X,Y) coordinates. Discriminators 1784 must therefore be able to identify multiple hits on each electrode, and send this count information to FPGA 1786.

In one embodiment, to accurately record the number of hits on a wire if they get too large, the readout electronics are organized via a grid type of architecture that monitors, records and integrates the individual event counting results from a number of smaller sub arrays, thus requiring that more wires be brought out to reduce the number of coincident events along an extended length of electrode wire. Bringing out more wires require more, but simpler, discriminators.

In one embodiment, chains of connected (or isolated) cells with individual cell or line quench resistors on the high voltage cathode line establish the readout sites along one coordinate (e.g., the X-line) on one substrate. Parallel chains of connected sense lines or anodes provide the second orthogonal coordinate (Y-line) readout. For this embodiment each cathode line is connected to the high voltage DC power supply with standard pulse discharge event detection circuitry connected to one or both electrodes.

Embodiments operate as highly-pixelated digital radiation detectors by flashing "ON" each pixel (which is normally "OFF") as a direct consequence of a gas discharge avalanche stimulated within the cell by incoming radiation, and so at their most basic level functionally behave as digital radiation counters and not as proportional counters. Each such gas discharge pulse is counted as having an approximately equal value (which has been experimentally verified numerous times) by a discharge event detector and is therefore counted by the circuit as simply an individual event. The amount of detected radiation is thus based on how many individual gas discharge events are outputted from the pixels. The electronic readout circuitry is thus designed to detect if and when a gas discharge pulse is outputted from the pixel (i.e., when a pixel has turned "ON"). In order to maximize the temporal resolution, the readout circuitry preserves the cell discharge output pulse rise time.

In this environment, very fast synchronous digital signal processing is directly applicable and can be flexibly implemented in large and fast FPGAs. FPGAs also provide largely parallel processing which further extends the data rates that can be handled. The processing of these signals can be via synchronous programmable logic, but for more demanding applications a conventional fiber-optic readout can be used with tracking and trigger algorithms.

The speed of disclosed embodiments reduce the probability of fake or ambiguous association of hits from the two orthogonal readouts. The relatively large signal size also distinguish embodiments from those that require high gain amplifiers prior to the hit processing. In this environment, very fast synchronous digital signal processing is directly applicable and can be flexibly implemented in large and fast FPGAs.

Embodiments can exhibit single cell position resolution with nanosecond ("ns") and possibly sub-nanosecond timing resolution for hits separated by a dead time (i.e., recovery time) of the order of several ns. For embodiments requiring fast timing, the PPS cell size should be relatively small, and can approach something on the order of a hundred microns. With the small cell size, fast sampling, and recovery time, embodiments can potentially deliver per square centimeter hit rates of more than 100 MHz. Association of hits on the two axes at this rate would generate many ghost hits were it not for the fast timing. For example, if a 2 ns coincidence between coordinate axes is assumed, multi-GHz signal rates per 10×10 cm sub-panel are possible while rejecting most ghost hits. A conservative fraction of that rate, 200 MHz per sub-panel, is well within the capability of a modern FPGA.

One embodiment uses FPGAs over ASICs because they are fast enough and have the important advantage of design flexibility. This flexibility is ideally suited to examine the temporal and positional information in the bit streams, and developing algorithms to associate, refine, and compact data from nearby cells into an overall cluster or track segment. For example, an embodiment with a design having one processing section to assemble the primitives (time and strip) with a second section to do correlations is flexible and offers significant data compaction (i.e., no hit, no bandwidth used).

In one embodiment for a small device designed for extremely high-rate counting, the electronics include "coincidence" logic. Hits are to be represented in 2 dimensions (for example, 16 bits×2), plus a time coordinate based on a synchronous 100 MHz clock and a 16 stage delay loop. The time coordinate can be represented as a 12 bit clock count with a 4 bit sub-interval, giving a sub-nanosecond time stamp. Transmitting these 48 bits continuously at 500 MHz is a non-trivial task. Therefore a simplified design would provide buffers with sufficient space to hold all 2 coordinate hits from multiple pixel firings, and multiplex these hits to a single 1.6 GHz fiber. Output from this fiber is then directed into a computer based fiber receiver. The high speed data flow from the sub-panel would be accepted until the fiber buffers reach a limit (typically ⅔ full). Later, when the computer has reduced the buffer content below ⅓, the buffer will be enabled to receive additional data.

Referring again to FIG. 5, the side view of ultra-thin window gas chamber enclosure 501 shows two sets of double foil windows 503 in accordance with one embodiment. Although FIGS. 4, 5 and 6 identify the ultra-thin gas chamber windows 403, 503 and 603, respectively, as foil windows, in other embodiments windows 403 503 and 603 are coated polymer thin-film windows which includes metalized polymer films. In other embodiments, the ultra-thin windows could be multilayered metal foils such as nickel, aluminum, copper, gold, etc., coated titanium foil, or titanium, nickel, copper, gold, etc., coated aluminum foil, or any other metal metal-foil combination including beryllium foil or alloy foils based on metals such as iron, cobalt, nickel or molybdenum, for example stainless steel type foils. In most embodiments, the gas mixture component composition between the double foil windows will be the same as the gas mixture component composition inside the chamber and flowing through PPS panel 502 of FIG. 5, or through PPS multiple panels 602 of FIG. 6. In one embodiment, the gas pressure between the double foil windows is approximately the same as the gas pressure inside the chamber and flowing through PPS panel 502, or through PPS multiple panels 602. In other embodiments, the gas pressure between the double foil windows can be either greater than, or less than, the gas pressure inside the chamber and flowing through the PPS panel or panels.

The gas chamber enclosures in FIGS. 4, 5 and 6 are shown and described as allowing continuous gas flow, with each chamber having a set of entrance and exit gas ports or gas control valves 405-406, 505-506 and 605-606, respectively, to allow gas to flow in and flow out as illustrated by the arrows next to each valve. This style of gas continuously flowing through the chamber is sometimes referred to as a "dynamic gas flow chamber." However, in some embodiments the above described gas chambers could be operated as static gas-filled chambers requiring only a single gas valve, especially if the chambers are designed and fabricated as ultrahigh vacuum ("UHV") systems employing Conflat-style CF-flanges with metal gaskets. Depending upon the ultra-thin window material composition, the window aperture size (e.g., inside diameter opening), the pressure differential (i.e., the pressure difference between inside and outside the chamber), the number of parallel ultra-thin windows (i.e., single vs. double vs. triple ultra-thin window configuration), whether or not the ultra-thin window is backed up with a mechanical support structure or system, and whether or not the ultra-thin window chamber is designed as a static or dynamic gas system, each individual ultra-thin window thickness can vary over a very wide range spanning, for example from about 1 to 200 microns.

In the case of a static-UHV chamber, which requires only a single valve for both gas evacuation and gas fill, such as 405, 505 or 605, the second valve 406, 506 or 606 can be respectively eliminated. In one embodiment of a static-UHV chamber, the ultra-thin chamber window can be fabricated from metal foils such as titanium having a thickness falling within at least a ten-fold thickness range, for example from approximately 0.0005" to 0.005". In another static-UHV chamber embodiment, a double ultra-thin metal foil layer window arrangement could be employed, for example with each layer consisting of a 0.0003" to 0.003" thickness of titanium foil.

For the thinnest windows, a dynamic gas flow-through chamber construction is favored as it can tolerate more gaseous diffusion and gas permeation through the ultra-thin window material because the internal chamber gas is being constantly exchanged and replenished. However, for maximum simplicity and minimum cost in terms of not needing to stock and maintain an onsite gas storage and gas exchange/distribution system, a slightly thicker window material design is favored with a static-UHV chamber construction. In another embodiment, the ultra-thin chamber windows could also be fabricated as triple layer windows, being either a triple layer of metal foil or a triple layer of metalized polymer film, or some combination of each. Such an arrangement could be used in either a gas flow-through chamber or a static gas-filled chamber. The gas composition between the multiple ultra-thin window layers would be approximately the same as that inside the chamber and flowing through the PPS panel or panels.

Similarly, for a two or more layer ultra-thin window construction such as in FIG. 5, the gas pressure in the volume between the foil windows 503 could be the same, less than, or more than, the gas pressure inside the chamber and flowing through the PPS panel or panels. In the embodiments based on a static gas-filled chamber design and construction, the chamber would periodically require occasional gas refilling or recharging. For well-designed UHV chambers with foil windows, gas contamination from outgassing, diffusion and permeation, could be at a slow enough rate such that the chamber is able to satisfactorily maintain its gas-filled composition integrity for a period of months or possibly even years, depending upon the chamber construction and materials, and on the specific application performance requirements.

Depending upon the difference between the chamber internal gas pressure, and the ambient external gas pressure, as well as the ultra-thin window surface area dimensions and thickness, in some embodiments the window will incorporate internal and/or external structural reinforcement (e.g., some type of wire or narrow grid wall patterned structural reinforcement). In some embodiments, the gas mixture could contain a halogen gas component such as $Br_2$, $Cl_2$ or $F_2$, in combination with an inert gas (e.g., He, Ne, Ar, Kr or Xe), or an inert gas mixture that could also include other relatively inert gas components such as: $N_2$, $SF_6$, $CO_2$, or fluorocarbons such as: $CF_4$, $C_2F_6$, $C_3F_8$, $C_4F_8$, $C_4F_{10}$, $C_5F_{12}$, etc. Other embodiments of gas mixtures could contain any combination of the above gas components.

The ultra-thin dielectric substrates as described herein can also include inorganic substrate materials that are crystalline in nature such as micas which are commercially available in thicknesses down to about 5 microns. In one embodiment, the ultra-thin PPS panels as described herein (e.g., in FIGS.

2, 4, 10, 12, 14 and 15) can be fabricated using mica substrates that range in thickness from about 5 to 20 microns.

Depending upon the application, the PPS panels as described herein (e.g., FIGS. 1-6, 8, 10, 12, 14 and 15) can suffer from charge buildup on the front and/or back dielectric substrate surfaces. Although charges can accumulate on both the anode or cathode substrate surfaces, the most serious charge buildup will tend to occur of negative charge on the anode substrate side. This charge buildup can degrade the PPS device performance over time, because as the charge accumulates the net electric field diminishes, which can adversely affect device efficiency and long-term stability. In order to minimize or eliminate this problem, one option is to select a dielectric substrate with sufficiently low surface resistivity such that it can bleed off the charge as it is deposited and accumulates on the dielectric surface. For example, in one embodiment ESD-Alumina by CoorsTek (also marketed under the name StatSafe™ Alumina) can serve as the panel substrate on the anode side. In another embodiment, ESD zirconia by CoorsTek, marketed under the name CeraStat® Zirconia, can serve as the panel substrate on the anode side. However, if the surface resistivity is too low, then the PPS performance could be compromised by the electrodes effectively shorting out. A more universal approach is to coat the dielectric substrate with an appropriate thin-film layer having the desired surface resistivity. However, any such thin-film dielectric coating must also have the requisite physical, electrical and chemical properties so as not to degrade or react with the discharge gas or adversely interact with the plasma discharge process or with electrode operation.

A number of different coating materials and coating thicknesses can be successfully employed for the purpose of adjusting, altering, controlling and/or modifying the substrate surface resistivity. Examples include a variety of pure, or mixed, or blended, or doped crystalline, or partially crystalline, or amorphous dielectric materials having the required surface resistivity, including materials specifically processed to reduce their surface resistivity such as by being oxygen depleted. Such materials can include a select group of semiconductors, glasses and ceramics, as well as various blends or mixtures or alloys or doped blends of such materials. Some embodiments of such materials include thin-film coatings of electrostatic discharge-safe (i.e., ESD-safe) ceramics engineered to prevent charge accumulation and/or static electricity buildup, with typical thicknesses in the range of 0.01 to 10 microns. Examples of a few such types of bulk ESD-safe materials include trade name products such as: StatSafe™, ArcResist™, and CeraStat®. For example, three such materials include: StatSafe™ Alumina, StatSafe™ Silicon Carbide, and CeraStat® Zirconia. In one such embodiment, a thin-film coating of StatSafe Alumina, also known as ESD-Alumina or ADC-92 (i.e., a specially processed, mixed ceramic containing approximately 92% alumina), was successfully coated on both glass and ceramic substrates. Lower surface resistivity materials than ESD-Alumina include: boron carbide ($B_4C$) as well as pure boron itself, pure intrinsic silicon (Si), silicon carbide (SiC), tungsten carbide (WC), etc.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. An ultra-thin radiation detector comprising:
   a radiation detector gas chamber having at least one ultra-thin chamber window;
   an ultra-thin first substrate contained within the gas chamber;
   a second substrate generally parallel to and coupled to the first substrate and defining a gas gap between the first substrate and the second substrate;
   a discharge gas between the first and second substrates and contained within the gas chamber, wherein the discharge gas is free to circulate within the gas chamber and between the first and second substrates at a given gas pressure;
   at least one first electrode coupled to one of the substrates;
   at least one second electrode electrically coupled to the first electrode;
   a first impedance coupled to the first electrode;
   a power supply coupled to at least one of the electrodes;
   a first discharge event detector coupled to at least one of the electrodes for detecting a gas discharge counting event in the electrode; and
   a plurality of pixels defined by the electrodes, each pixel capable of outputting a gas discharge counting event pulse upon interaction with ionizing radiation.

2. The radiation detector of claim 1, wherein the gas chamber has a set of entrance and exit gas control valves to allow gas to continuously flow through the gas chamber.

3. The radiation detector of claim 1, wherein the gas chamber is constructed as an ultrahigh vacuum chamber and configured to operate as a static gas-filled chamber requiring only a single gas valve.

4. The radiation detector of claim 3, wherein the ultrahigh vacuum chamber comprises CF-flanges with metal gaskets.

5. The radiation detector of claim 3, wherein the gas chamber has at least two separated, parallel, ultra-thin chamber windows located on a same chamber side.

6. The radiation detector of claim 3, wherein at least one of the ultra-thin chamber windows comprises an ultra-thin metal foil.

7. The radiation detector of claim 3, wherein the gas chamber has a second set of at least two separated, parallel, ultra-thin chamber windows, parallel to a first set of ultra-thin chamber windows and located on the opposite chamber side.

8. The radiation detector of claim 6, wherein the at least one of the ultra-thin foil chamber windows comprises a titanium foil window material.

9. The radiation detector of claim 1, wherein the gas chamber has at least two separated, parallel, ultra-thin chamber windows located on a same chamber side.

10. The radiation detector of claim 9, wherein at least one of the ultra-thin chamber windows comprises an ultra-thin metal foil.

11. The radiation detector of claim 9, wherein at least one of the ultra-thin chamber windows comprises a metalized ultra-thin polymer film.

12. The radiation detector of claim 9, wherein the gas chamber has a second set of at least two separated, parallel, ultra-thin chamber windows, parallel to a first set of ultra-thin chamber windows and located on the opposite chamber side.

13. The radiation detector of claim 10, wherein at least one of the ultra-thin foil chamber windows comprises a titanium foil window material.

14. The radiation detector of claim 1, wherein the discharge gas comprises at least one inert gas component.

15. The radiation detector of claim 1, wherein the discharge gas comprises at least one fluorocarbon gas component.

16. The radiation detector of claim 1, wherein the discharge gas comprises at least one halogen gas component.

17. The radiation detector of claim 1, wherein the discharge gas comprises at least one fluorocarbon and one halogen gas component.

18. The radiation detector of claim 14, wherein the discharge gas comprises at least one fluorocarbon gas component.

19. The radiation detector of claim 18, wherein the discharge gas comprises at least one halogen gas component.

20. A method of detecting radiation comprising:
   receiving radiation at an ultra-thin first substrate contained within a radiation detector gas chamber having at least one ultra-thin chamber window;
   creating at least one ion-pair in a gas contained within a gas gap between the first substrate and a second substrate generally parallel to and coupled to the first substrate; and
   causing a gas-discharge event at a pixel, each pixel site defined by an anode and cathode that, wherein the discharge event is isolated and each pixel is capable of outputting a gas discharge counting event pulse upon interaction with ionizing radiation.

* * * * *